US006845886B2

United States Patent
Henry et al.

(10) Patent No.: US 6,845,886 B2
(45) Date of Patent: Jan. 25, 2005

(54) VALVE FOR DISPENSING TWO LIQUIDS AT A PREDETERMINED RATIO

(76) Inventors: Paul Henry, 4217 149th Ave. NW, Andover, MN (US) 55304; Steve Czeck, 3380 N. Victoria, Shoreview, MN (US) 55126; Philip Andrew Simmons, 26 Moorfield Road, Alcester, Warwickshire (GB), B49 5DA; Keith James Heyes, 26 Sandhills Road, Barnt Green, Warwickshire (GB), B45 8NR; Martin Johnson, 7 Rupert Kettle Drive, Bishops Itchington, Warwickshire (GB), CV47 2PU; Jamie Atkinson, 2 Emerald Close, Oakwood, Derbyshire (GB), DE21 2JZ ( * ) Notice: Subject to any disclaimer, the term of this patent is extended or adjusted under 35 U.S.C. 154(b) by 0 days.

(21) Appl. No.: 10/361,353

(22) Filed: Feb. 9, 2003

(65) Prior Publication Data
US 2004/0000560 A1 Jan. 1, 2004

Related U.S. Application Data

(63) Continuation-in-part of application No. 10/154,381, filed on May 22, 2002, now Pat. No. 6,705,489, which is a continuation of application No. 09/872,624, filed on Jun. 1, 2001, now abandoned, which is a continuation-in-part of application No. 09/870,297, filed on May 30, 2001, now Pat. No. 6,648,240.

(30) Foreign Application Priority Data

Aug. 23, 2000 (GB) .............................................. 0020805

(51) Int. Cl.[7] .................................................. B67D 5/56
(52) U.S. Cl. .................................................. 222/129.1
(58) Field of Search ....................................... 222/129.1

(56) References Cited

U.S. PATENT DOCUMENTS 4,936,488 A * 6/1990 Austin ...................... 222/129.1
6,705,489 B2 * 3/2004 Henry et al. ............. 222/129.1

* cited by examiner

Primary Examiner—Philippe Derakshani
(74) Attorney, Agent, or Firm—Pyle & Piontek

(57) ABSTRACT

A post-mix beverage valve provides for automatic, accurate beverage ratioing. A valve body can be assembled, and includes a water flow hard body, syrup body and common nozzle body. The water and syrup flow bodies define flow channels and include one end for connection to water and syrup respectively, and opposite ends for fluid connection to the nozzle body. The water flow channel includes a turbine flow sensor connected to a micro-controller determining the water flow rate. The syrup flow channel includes a flow sensor, two MEMS pressure sensors, monitoring the syrup. The sensors are connected to the micro-controller and positioned about an orifice and senses sense a differential pressure indicative of syrup flow rate solenoid regulates flow of syrup through the syrup body. A stepper motor on the water body controls a rod in the flow channel in conjunction with a v-groove.

5 Claims, 29 Drawing Sheets

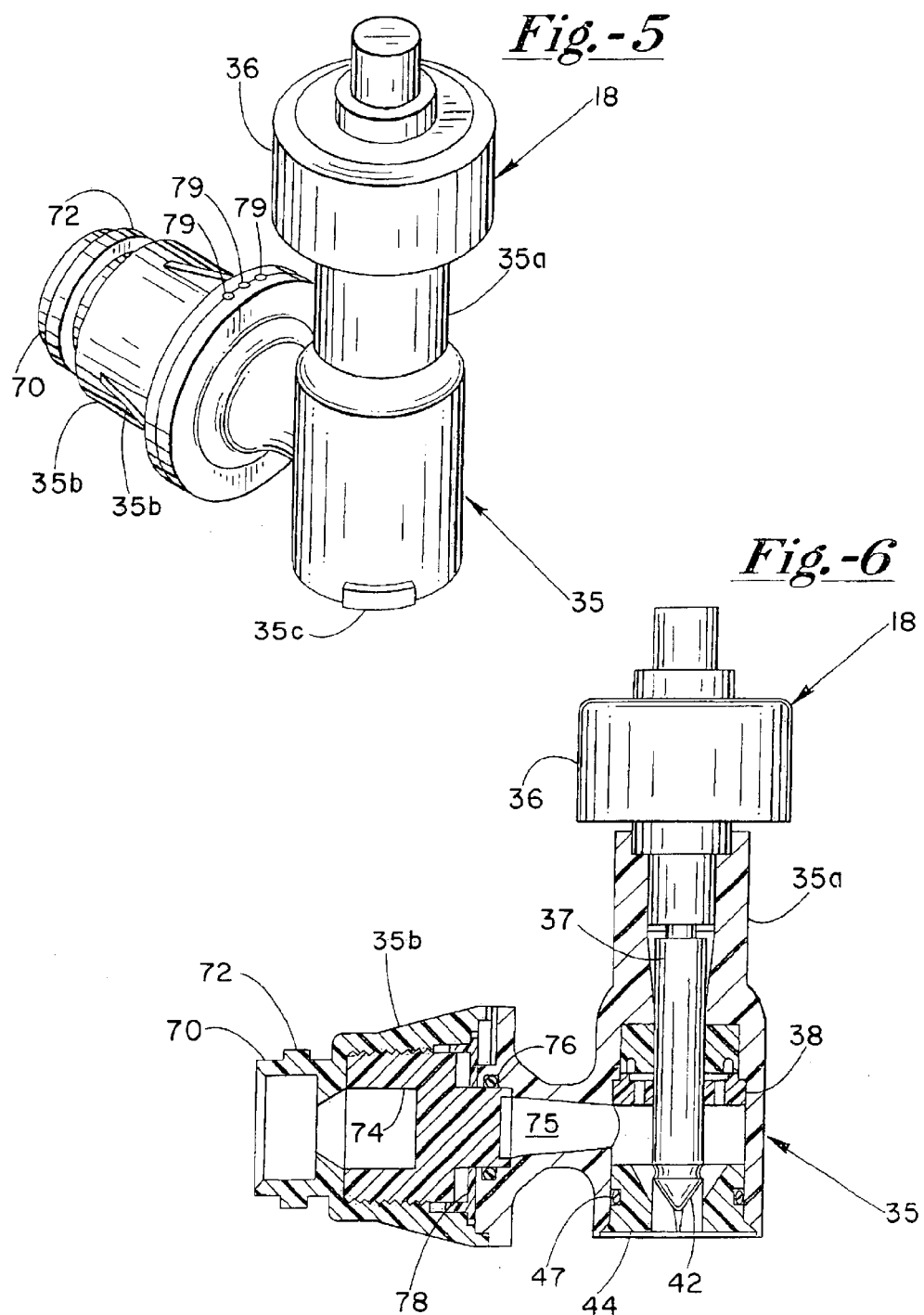

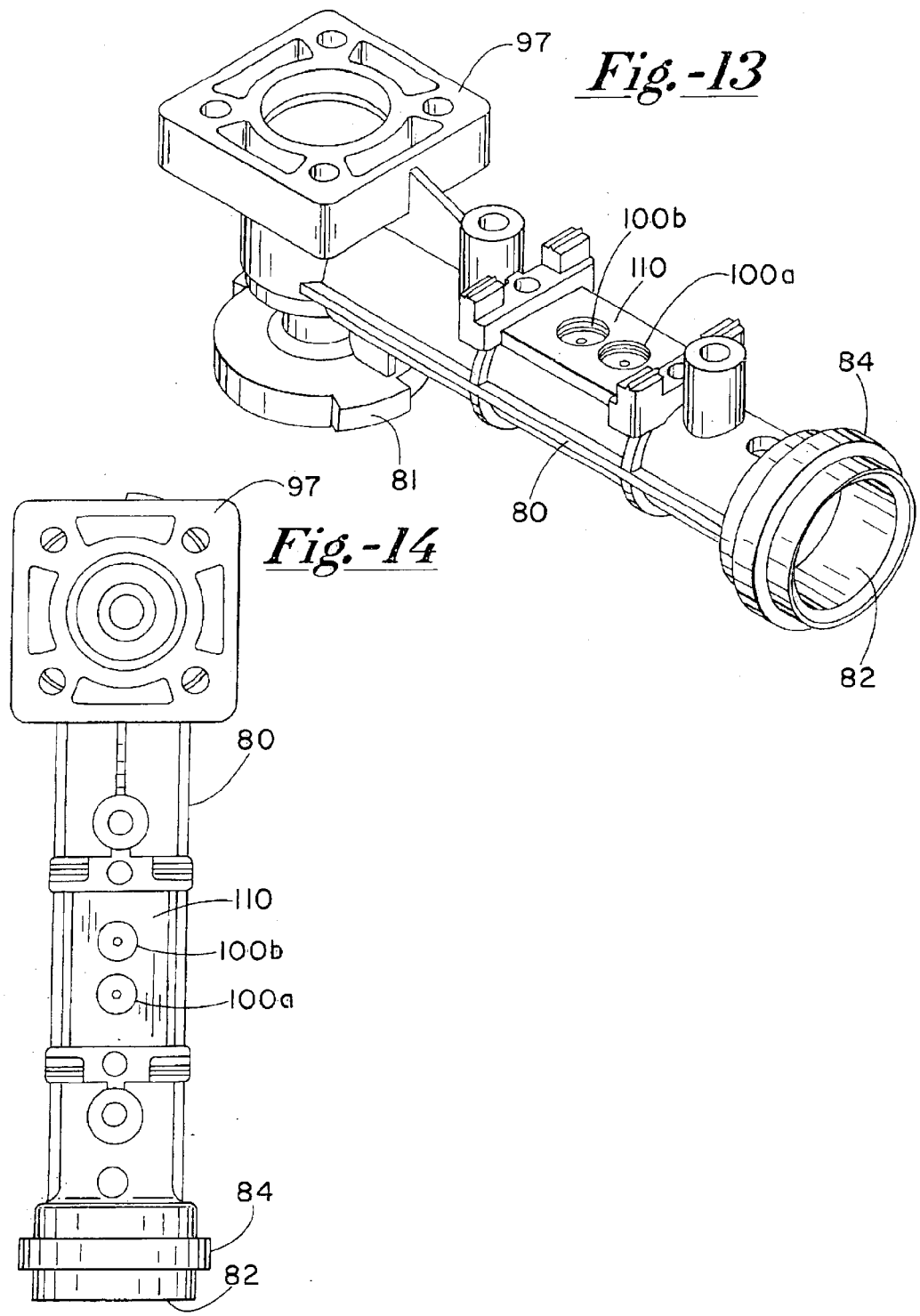

VALVE FOR DISPENSING TWO LIQUIDS AT A PREDETERMINED RATIO

This application is a continuation-in-part of Ser. No. 10/154,381 filed May 22, 2002 now U.S. Pat. No. 6,705,489, which is a continuation of Ser. No. 09/872,624 filed Jun. 1, 2001 now abandoned, which is a continuation-in-part of Ser. No. 09/870,297 filed May 30, 2001 now U.S. Pat. No. 6,648,240.

FIELD OF THE INVENTION

The present invention relates generally to post-mix beverage dispensing valves and in particular to such valves having active ratio control apparatus.

BACKGROUND

Post-mix beverage dispensing valves are well known in the art and are typically used to mix together two beverage constituents at a desired ratio to produce and dispense a finished drink. Such constituents generally consist of a concentrated syrup flavoring and a diluent comprising carbonated or uncarbontaed water. Various control strategies have been employed to maintain the desired syrup to water ratio. "Piston" type flow regulators are a well known purely mechanical system that employ spring tensioning of pistons that constantly adjust the size of orifice flow openings to maintain the desired ratio between the fluids. However, a failing with such systems is that they require both fluids to be held within relatively narrow flow rate windows in order to work effectively. As is well understood, differences in ambient temperature, syrup viscosity, water pressure and the like can all conspire to affect one or both of the flow rates to a degree that the drink is ratioed improperly becoming either too dilute or too concentrated. As a result thereof, a drink that is too sweet can waste syrup costing the retailer money, and whether too sweet or not sufficiently so, presents the drink in less than favorable conditions, also reflecting negatively on the retailer as well as the drink brand owner.

Volumetric piston dispense systems, as differentiated from the above piston based flow regulators, attempt to measure the volumes of each liquid using the known volume of a piston and the stroke thereof. Thus, two pistons, one for the syrup and one for the water are driven simultaneously by the same shaft or drive mechanism and are sized to reflect their desired volume ratio difference. Thus, operation of both pistons serves to move the desired volume ratio of each of the fluids from separate sources thereof to the dispense point or nozzle of the valve. However, these systems have met with difficulty in that there inherently exists a mechanical complexity relative to providing for inlet and outlet lines to each piston and providing for the correct timing of the opening and closing of such lines. Such complexity increases cost, imposes manufacturing difficulties and reduces operating reliability. Also, there exist size constraints that require the pistons to be relatively small resulting in high operating speeds that lead to corresponding seal and other mechanical wear issues, as well as undesired pumping phenomena where less than a full volume is moved with each pump stroke. Naturally, such wear and pumping inaccuracy problems can negatively impact the ratio accuracy.

Electronic post-mix valves are also known that utilize sensors for determining the flow rate of either the water, the syrup or both, and then, through the use of a micro-controller, adjust "on the fly" the flow rates of either or both of the water and syrup. In addition, hybrid systems are known that utilize both a volumetric piston approach for the syrup and a flow sensing of the water flow. However, such post-mix valves continue to be plagued with cost and reliability problems. The sensors, for example, can be both costly and unreliable. Thus, maintenance of such post-mix valves by trained service technicians remains a large part of the life cost thereof In general, it appears that the ratioing technology employed in such electronic valves, while useful in large scale fluid ratioing applications, does not translate well into the relatively small size requirements required of such valves.

Accordingly, there is a great need for a post-mix valve that can accurately maintain the proper drink ratio consistently over time regardless of changes in temperature, flow rate and so forth and that is low in cost both as to the purchase price and the maintenance thereof.

SUMMARY OF THE INVENTION

The present invention comprises a post-mix beverage dispensing valve that provides for automatic and accurate fluid beverage constituent ratioing, and that is reliable and relatively inexpensive to manufacture and operate. A valve body is designed to be easily assembled and disassembled by hand without the need for hand tools, and includes a water flow body and a syrup flow body releasably securable to a common nozzle body portion. The water and syrup flow bodies each include a horizontally extending flow channel fluidly intersecting with a vertically extending flow channel. The horizontally extending channels of the water and syrup flow bodies each include open ends for connection to sources of water and syrup respectively, and include fluid flow sensors. When secured together, the water, syrup and nozzle bodies are securable as an intact unit to an L-shaped support plate having a horizontally extending base portion and a vertically extending connection facilitating end. A quick disconnect block provides for releasable fluid tight sealing with the open ends of the horizontal water and syrup channels and, in turn, releasable fluid tight sealing with fittings extending from a beverage dispense machine. The bottom end of the support plate includes a hole centered below a bottom end of the nozzle body through which a nozzle is secured to the nozzle body. Water and syrup channels in the nozzle body deliver the water and syrup thereto for mixture within the nozzle for dispensing there from into a suitable receptacle positioned there below. The syrup channel in the nozzle body includes an adjustment setting mechanism that serves as a gross setting for the syrup flow rate within a certain desired range.

The water body horizontal channel flow sensor is of the turbine type and disposed in the channel and includes hall-effect electronics for determining the rotational velocity of the turbine. That velocity information is provided to a micro-controller for determining the flow rate of the water. The syrup body horizontal channel sensor comprises a pair of strain gauge type pressure sensors mounted to and in an exterior wall portion of that channel and extending there through so that the operative parts thereof are presented to the syrup stream. The sensors are also connected to the micro-controller and are positioned on either side of a restricted orifice washer positioned in the flow stream. The syrup flow sensors serve to sense a differential pressure from which the flow rate of the syrup can be interpolated by the micro-controller.

The vertical flow channel of the water body has a stepper motor secured to a top end thereof and a "V"-groove type flow regulator and valve seat at an opposite bottom end thereof An actuating rod extends centrally of the vertical flow channel and is operated by the stepper motor to move linearly therein. The rod includes a tapered end for cooperative insertion through the center of a coordinately tapered central hole of the V-groove regulator. A tip end of the tapered rod end cooperates sealingly with a seat to regulate flow of the water past the seat and into the nozzle body. The stepper motor is connected to a suitable power source and its operation is controlled by the micro-controller.

A solenoid having a vertically extending and operating armature is secured to a top end of the vertical flow channel of the syrup body. The armature is operable to move in a downward direction through the vertical syrup flow channel and has a distal end that cooperates with a seat formed in the nozzle body positioned centrally of that vertical flow channel at a bottom end thereof. The solenoid is also connected to a suitable power supply and controlled by the microcontroller.

An outer housing is secured to the support plate and serves to cover and protect the valve body sections, actuating devices and an electronics board containing the electronic micro-controller based control. The valve can be actuated by various means including, a lever actuated microswitch or one or more push switches on the front face of the valve.

In operation, actuation of a valve switch causes the syrup solenoid to open and the stepper motor to retract the linear rod to a predetermined position away from its seat. The syrup and water then flow through the nozzle body to the nozzle and are subsequently mixed together for dispensing into a cup of other receptacle. As the water is flowing, it rotates the turbine flow sensor and the rotational speed thereof is translated into a flow rate by the micro-controller. At the same time, the differential pressure sensors are sensing the pressures on each side of the restricted orifice and the micro-controller is, based on that information, calculating a flow rate for the syrup. It will be appreciated by those of skill that the position of the linear rod tapered end vis a' vis the v-groove regulator, changes the size of the opening leading to the nozzle body through which the water must flow. Thus, the flow rate of the water can be adjusted in that manner in proportion to the size of that opening whereby the stepper motor can be actuated to position the linear rod tapered end at any point between full open and full closed. Therefore, in the valve of the present invention, the micro-controller first determines the flow rate of the syrup and then adjusts the flow rate of the water accordingly in order to maintain a pre-programmed ratio between the two liquids at a preprogrammed or desired flow rate. A gross adjustment of the syrup flow rate is provided by the adjustment means in the nozzle body and serves to determine a range as, for example, between a high flow and low flow application, such as, between a 1½ or 4 ounces per second dispense rate.

A major advantage of the preset invention is the combination of the adjustable linear actuation of the rod that interacts with v-groove regulator to regulate the flow rate of the water. This approach is quite accurate, is reliable and low in cost. Determining the flow rate of the water through the use of a turbine flow meter has also proven reliable and low in cost. A further major advantage of the present invention is the use of a microelectronic strain gage type differential pressure sensor approach for determining the syrup flow rate. Syrup has proven to be a difficult substance to work with owing in large part to its viscosity, the temperature sensitivity of that viscosity and that it can be corrosive and harbor the growth of microorganisms. The microelectronic sensors have been found herein to be suitable for use with beverage syrups in that they are able to accurately sense variations in the flow rate thereof without much effect as to viscosity changes, and are not degraded chemically over time. In addition, the particular mounting of the sensors requires a very small area of contact with the syrup resulting in a structure that does not cause any type of syrup build up or cleanliness concerns. The syrup flow sensing approach of the present invention provides the further advantage of also providing for a valve that is relatively compact, light in weight and low in cost.

The ability of the valve of the present invention to be disassembled by hand, including the internal components of the water, syrup and nozzle bodies provides for ease of manufacture and repair thereby also reducing the resultant purchase and life costs thereof.

DESCRIPTION OF THE DRAWINGS

A better understanding of the structure, function, operation and the objects and advantages of the present invention can be had by reference to the following detailed description which refers to the following figures, wherein:

FIG. 5 shows a side perspective view of the water body assembly.

FIG. 6 shows a cross-sectional view of the water body assembly.

FIG. 13 shows an enlarged perspective view of the syrup body.

FIG. 14 shows a top plan view of the syrup body.

FIG. 27 shows a diagram of the flow characteristics of the grooved regulator of FIG. 29a.

FIG. 28. show a schematic representation of a cross-section of the regulator of FIG. 29a.

DETAILED DESCRIPTION OF THE PREFERRED EMBODIMENT

Figure 1:
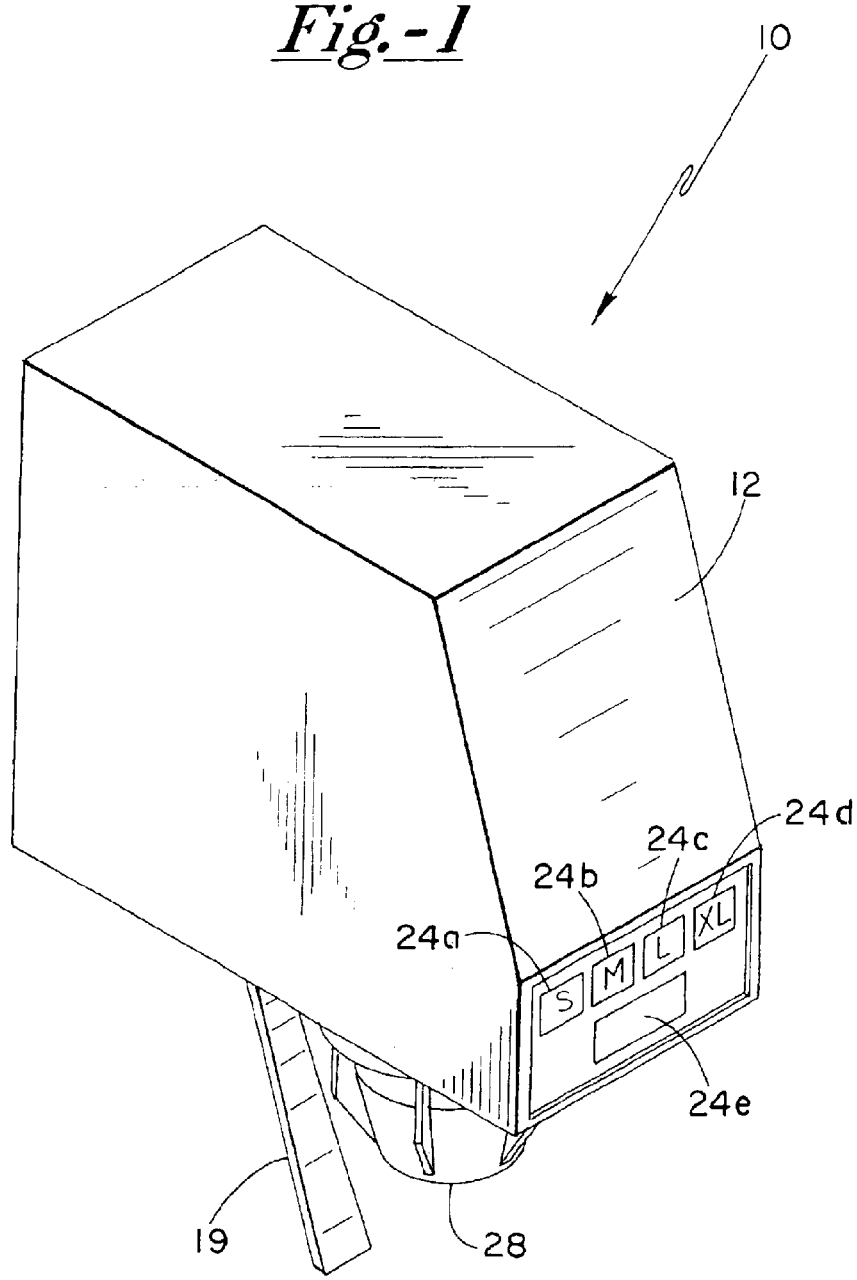
FIG. 1 shows a perspective view of the valve of the present invention.
Figure 2:
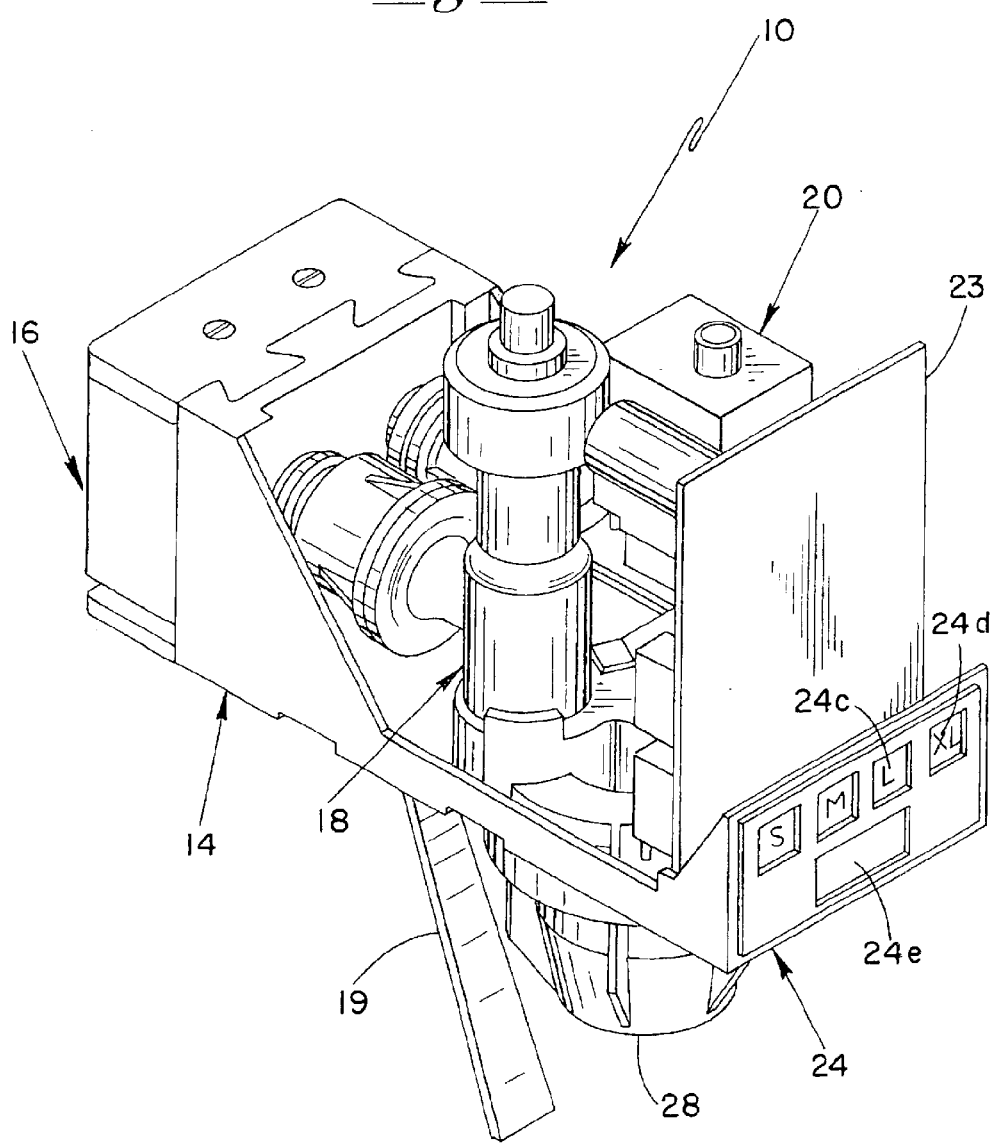
FIG. 2 shows a further perspective view of the invention herein with the outer cover removed.
Figure 3:
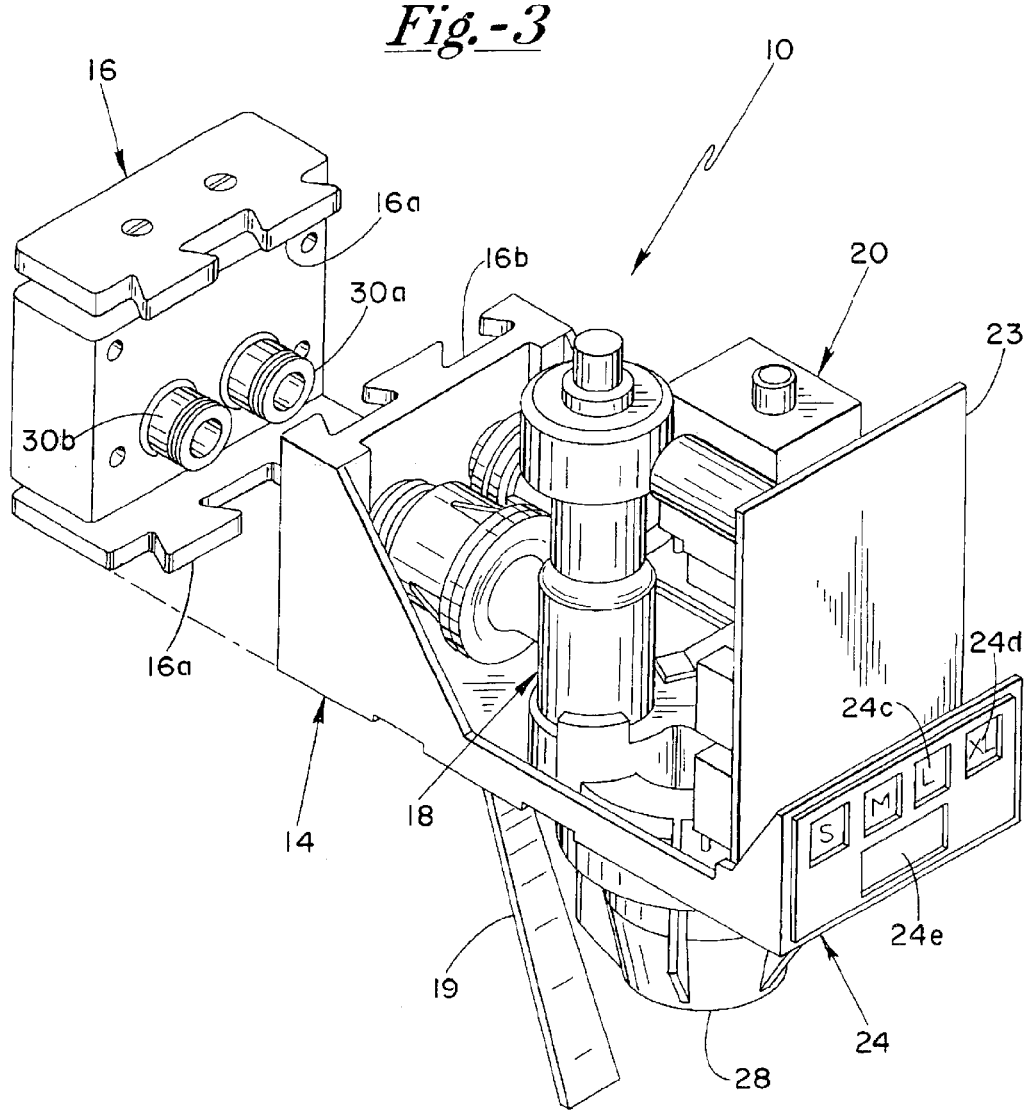
FIG. 3 shows an exploded view of the valve herein and including a quick disconnect block.
Figure 4:
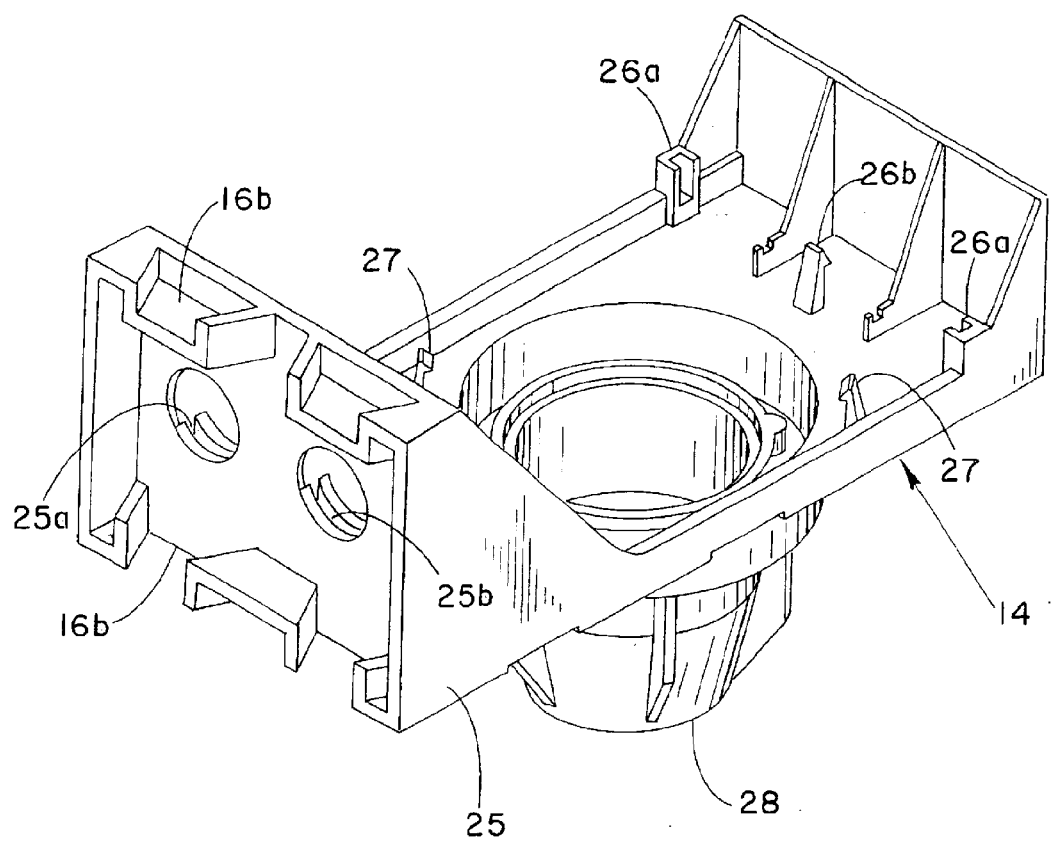
FIG. 4 shows a perspective view of the base plate.

The valve of the present invention is seen in FIG. 1 and generally referred to by the numeral 10, and includes a removable outer protective shell 12. Removal of shell 12, as seen in FIGS. 2 and 3, reveals various internal valve components including a base plate 14, a quick disconnect mounting block 16, a syrup flow body assembly 18, a water flow body assembly 20, a nozzle body assembly 22 and a printed circuit board electronic control 23. Base plate 14 includes a front push button control portion 24 having a plurality of diaphragm type switches 24a–24e for operating valve 10. Switch 24e causes valve 10 to dispense for as long as it is operated/pushed. In the same manner, a lever arm 19 can alternatively be used to operate a switch, not shown, to cause valve 10 to dispense. As is well understood, arm 19 is pivotally suspended from base plate 14 and is typically actuated by pushing a cup to be filled there against followed by retraction of the cup once it is filled. Switches 24a–e are of the portion control variety wherein selection of a particular switch serves to operate valve 10 to dispense a preprogrammed volume of drink. It is also known to have the valve turned off automatically based upon a sensing that the cup is full.

Base plate 14 also includes a vertical rear portion 25 having formed in a shelf area 25' thereof two semi-circular annular grooves 25a and 25b. Plate 14 further includes circuit board retaining slots 26a and a circuit board retaining clip 26b as well as a pair of nozzle body retaining clips 27. A nozzle housing 28 is secured to nozzle body 22 through a hole in a bottom surface of plate 14, the hole defined by a perimeter shoulder S. Quick disconnect 16, as is well understood in the art, includes two barrel valves therein, not shown, for regulating the flow of water and syrup. The barrel valves are opened when the top and bottom trapezoidal insets 16a are received in correspondingly sized slots 16b in base 14 and locked thereto. Disconnect 16 includes fluid outlets 30a and 30b for fluid tight connection with syrup body assembly 18 and with water body assembly 20, respectively. Further description of disconnect 16 and the details of its operation are seen by referring to U.S. Pat. No. 5,285,815, which disclosure is incorporated herein. As is known disconnect 16 is secured to a beverage dispensing machine, not shown, and provides for quick fluid connection of valve 10 thereto.

Figure 7:
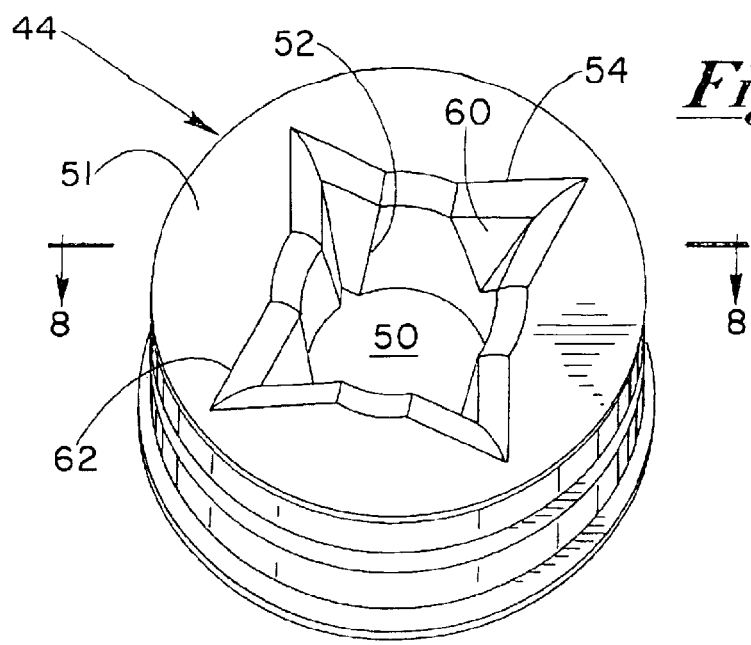
FIG. 7 shows a perspective view of the v-groove regulator
Figure 8:
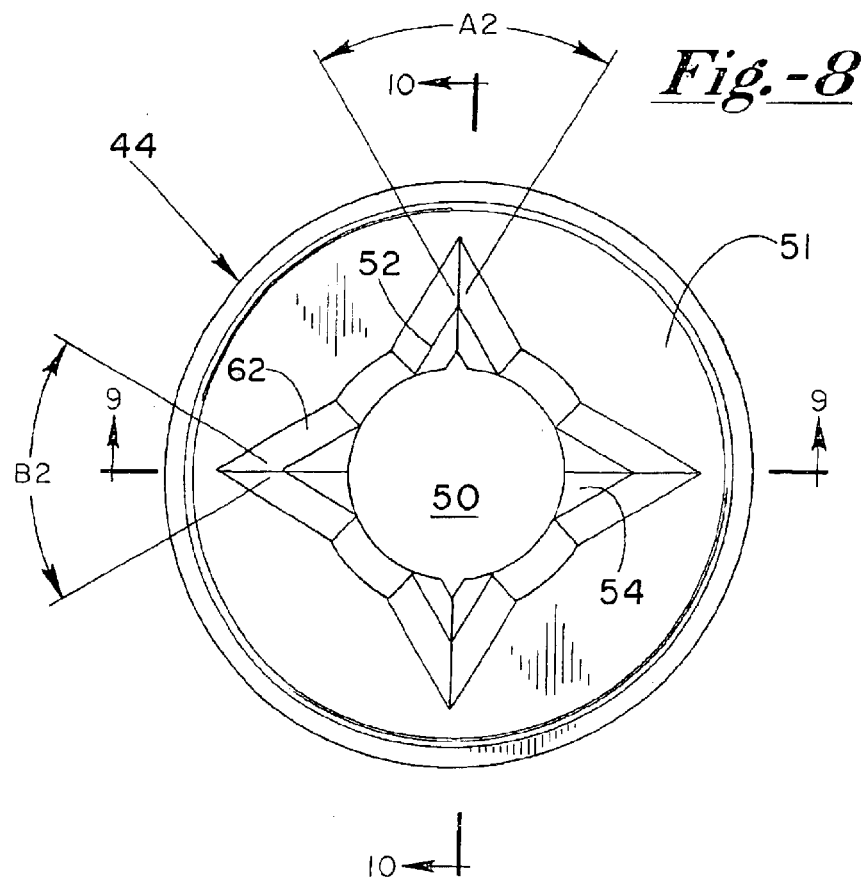
FIG. 8 shows a top plan view of the v-groove regulator.
Figure 9:
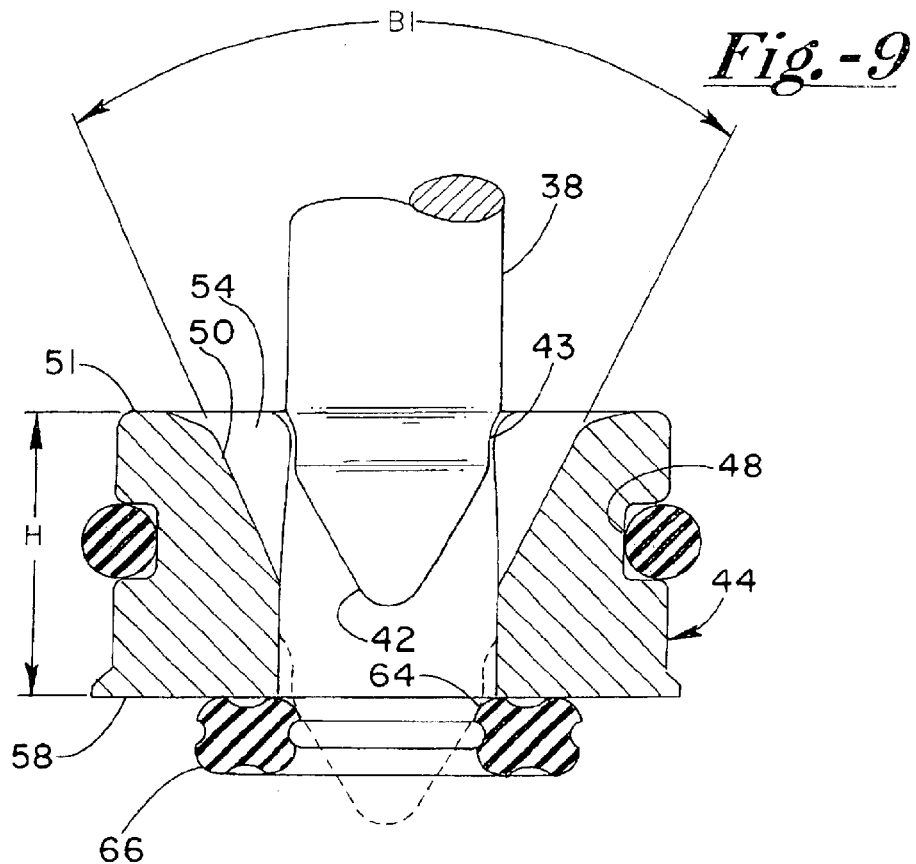
FIG. 9 shows an enlarged plan cross-sectional view along lines 9a of FIG. 8.
Figure 10:
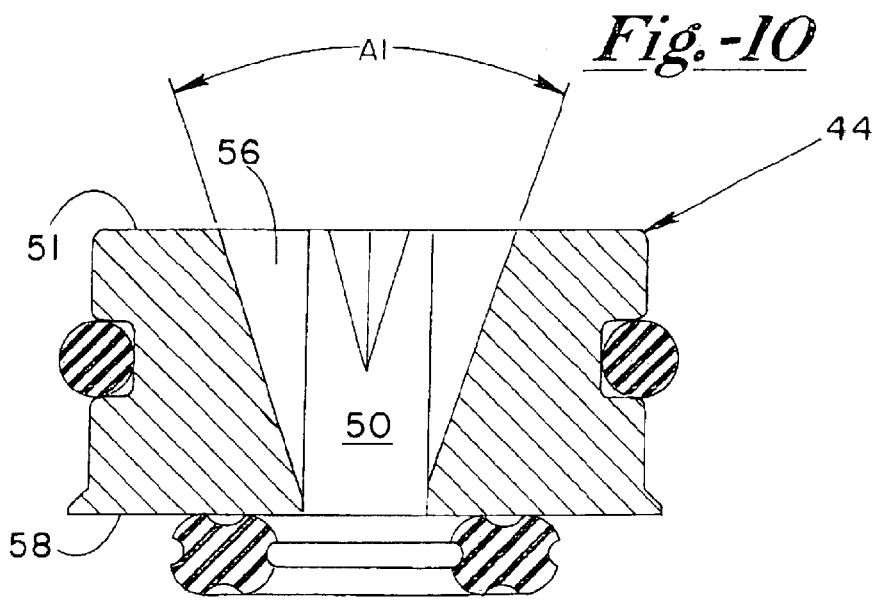
FIG. 10 shows an enlarged plan cross-sectional view along lines 9b of FIG. 8.
Figure 11:
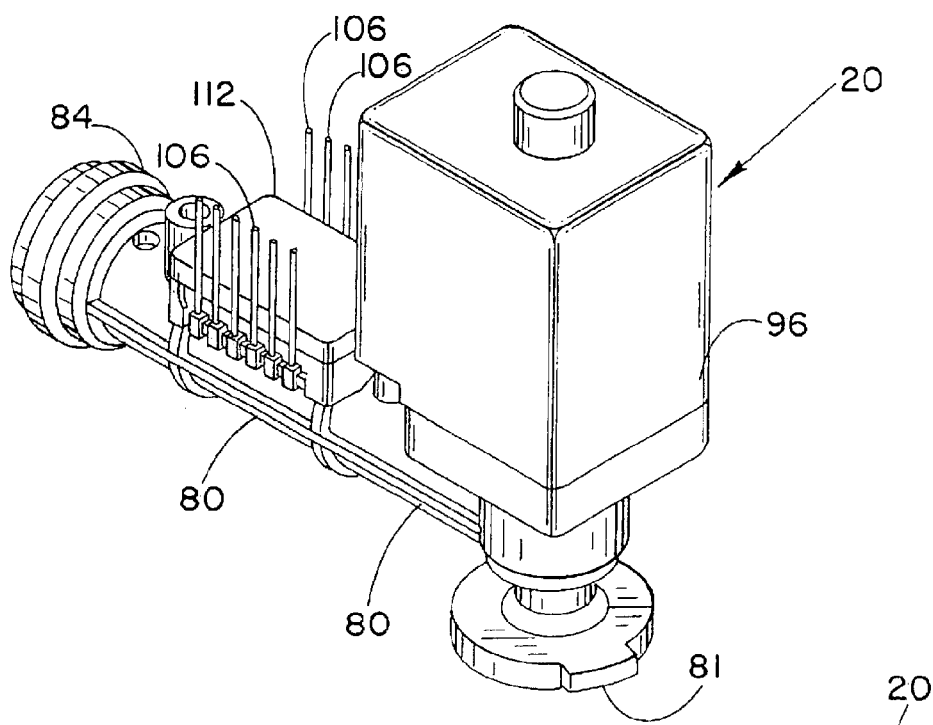
FIG. 11 shows a perspective view of the syrup body assembly.
Figure 12:
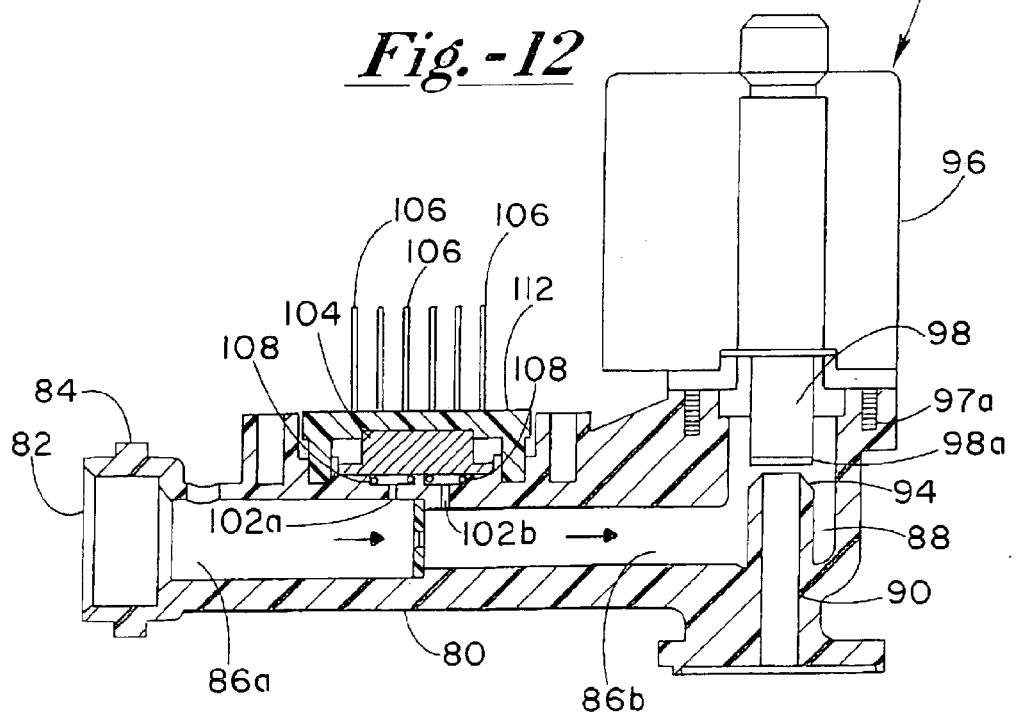
FIG. 12 shows a side plan cross-sectional view of the syrup body assembly.
Figure 15:
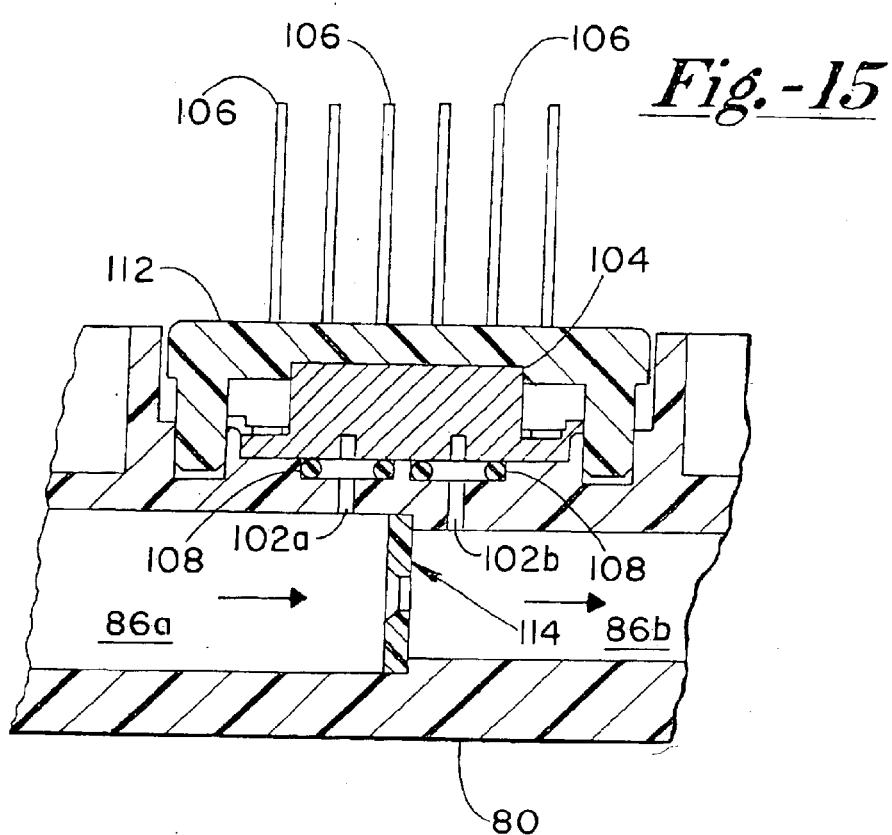
FIG. 15 shows and enlarged cross-sectional plan view of the differential pressure sensor portion of the syrup body assembly.

As seen by now referring to FIGS. 5–10, water body assembly 20 includes a plastic body portion 35 having a vertical flow regulating housing portion 35a and a horizontal flow meter housing portion 35b. A stepper motor 36 is secured to a top end of housing portion 35a and operates a vertically positionable shaft 37. In one embodiment of the present invention where the total flow rate is between 1 and ½ to 6 ounces per second, motor 36 operates on 3–5 volts and provides for a total shaft travel of 0.001 inch per step at a rate of 1 to 1000 steps per second. Shaft 37 extends through upper fluid sealing rings 38 and has a distal conical end 42 and a seating shoulder 43. As seen in the enlarged views of FIGS. 7–10, a specialized grooved fitting 44 is retained within a bottom end of housing 35a and sealed therein by an o-ring 46 received within a perimeter annular groove 48. Fitting 44 is circular having a height or thickness represented by the letter "H". Fitting 44 is formed by the drilling of a central hole or bore 50 there through having a diameter "D" followed by the formation of a plurality of V-shaped grooves or notches formed therein and extending downward from a top fitting surface 51. In the disclosed embodiment, there are four grooves consisting of two deep grooves 52 and two shallow grooves 54. The angular or cut away portion of grooves 52 represented by angular surfaces 56 extend to a bottom surface 58 of fitting 44. The corresponding surfaces 60 of grooves 54 terminate at a point approximately midway of the height or thickness H of fitting 44. The vertical or internal angular steepness of grooves 52 and 54 can be represented by angles A1 and B1 respectively. The width of the grooves 52 and 54 can be represented by top surface angles A2 and B2 respectively. A radiused or chamfered edge 62 extends around a top perimeter of grooves 52 and 54 and bore 50. As seen in FIG. 7, shaft 37 is vertically positionable through fitting 44 and at its bottom most position shoulder 43 seats against a perimeter edge 64 of a circular seat 66. It will be understood herein below that seat 66 is retained in nozzle body 22.

Water body portion 35b includes an inlet fitting 70 for receiving outlet 30b of quick disconnect 16. Inlet 70 has an outer annular ridge 72 that serves to cooperate with annular groove 25b of rear plate portion 26. A turbine type flow meter 74 is held within flow meter portion 35b. Portion 35b, with meter 74 therein, is then sealingly secured to body portion 35a, by for example sonic welding, for fluid tight securing in flow cavity 75. In addition, an o-ring 76 provides for further fluid isolation of the exterior of meter 74 from the water flow stream passing from inlet 70 into and through body portion 35a. Flow meter 74 is of a turbine type, well known in the art, and in the beverage valve embodiment of the present invention, is selected to work in an aqueous environment in a flow stream varying between approximately 0.25 to 11 ounces per second, having a sensitivity of 6000 pulses per second and exposed to pressures from 0 to 580 psi. Also in the preferred embodiment, turbine flow meter 74 has and exciter voltage in the range of 5–24 volts and uses approximately 12 milliamps of current. includes a circuit board 78 formed as a disk having a central hole on which are mounted optical sensors for determining the rotation of the rotatively mounted turbine (not shown). Wires (not shown) extend from disk 72 and extend through holes 79 for connection to main circuit board 23. As is understood, main control circuit board 23 embodies a micro controller that determines the rotation rate of the turbine of flow meter 74 and from that number calculates a flow rate of the water passing through flow portion 34. It will be appreciated that the securing of meter 74 in body portion 35b and the sealing thereof to body portion 35a along with the use of o-ring 76 also serves to isolate circuit board disk 78 from any damaging fluid contact. Body portion 35a includes a pair of locking tabs 35c extending from a bottom end thereof.

As seen in FIGS. 11–16, syrup flow body 18 includes a plastic flow body portion 80 having locking tabs 81, an inlet end 82 having a perimeter annular ridge 84 for cooperating with corresponding groove 25a of base plate vertical portion 25. Inlet 82 receives outlet 30a of quick disconnect 16 for providing syrup into a central horizontal flow channel comprised of a first channel portion 86a and a second channel portion 86b. Channel portion 86b communicates with a fluid cavity 88 wherein a vertically extending flow channel segment 90 extends. Flow segment 90 defines a portion of a vertical flow channel 92 and has a proximal perimeter seat end 94. An on/off solenoid 96 is secured to a surface area 97 of body portion 80 and includes and armature 98 having a resilient seat end 98a for closing against seat 94. Flow body 80 includes two circular recesses 100a and 100b that communicate fluidly to flow channel portions 86a and 86b through small orifices 102a and 102b respectively. Two pressure sensors, not shown, one associated with each recess 100a and 100b, are positioned therein to be exposed to the flow of syrup through channel portions 86a and 86b. The pressure sensors are of the well known pressure sensing diaphragm or micro-mechanical (MEMS) type and in the disclosed beverage valve embodiment herein are selected to respond to pressures in the range of 0–100 psi. Such sensors in the preferred embodiment operate at 3 to 5 volts dc, and need to have an accuracy or pressure nonlinearity of les than 1%. In the preferred form, the sensors are mounted to a common circuit board 104 which includes the electronics and connectors 106 for communicating sensed pressure data to control board 23. Ribbon type connectors, not shown, provide for the electrical connection from connectors 106 to board 23. O-rings 108 provide for fluid tight seating of the pressure sensors from the remainder of the board 104. Board 104 is held in place in against a flat surface area 110 by suitable attachment means, such as, food grade adhesive, or retaining clips, as well as by a retainer 112 which is also adhesively secured to flow body 80. As understood by referring to FIGS. 15 and 16, a flow washer 114 is retained at the intersection of flow channels 86a and 86b and has a thickness T', a central bore 116 half the length of which is enlarged by a chamfered edge 118 extending at an angle C. In the preferred form, the chamfered edge side of washer 114 faces in an upstream direction as will be understood by the direction of syrup flow indicated by the arrows of FIG. 15. As is known, the chamfered edge 118 serves to reduce the apparent thickness T. Those of skill will understand that the chamfer typically can face in a down stream direction providing the upstream edge is sharp, i.e. of a radius substantially less than the diameter of the orifice.

Figure 16:
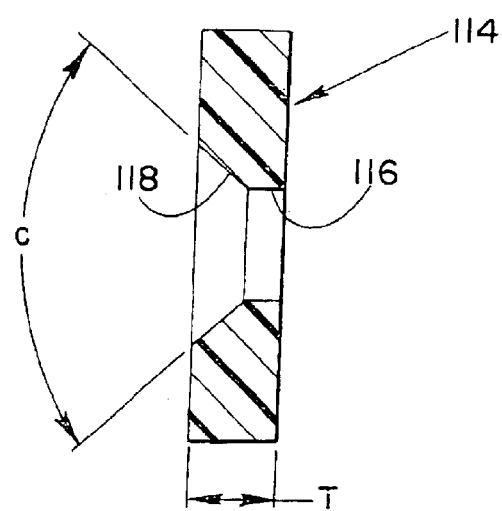
FIG. 16 shows and enlarged cross-sectional plan view of the flow washer.
Figure 17:
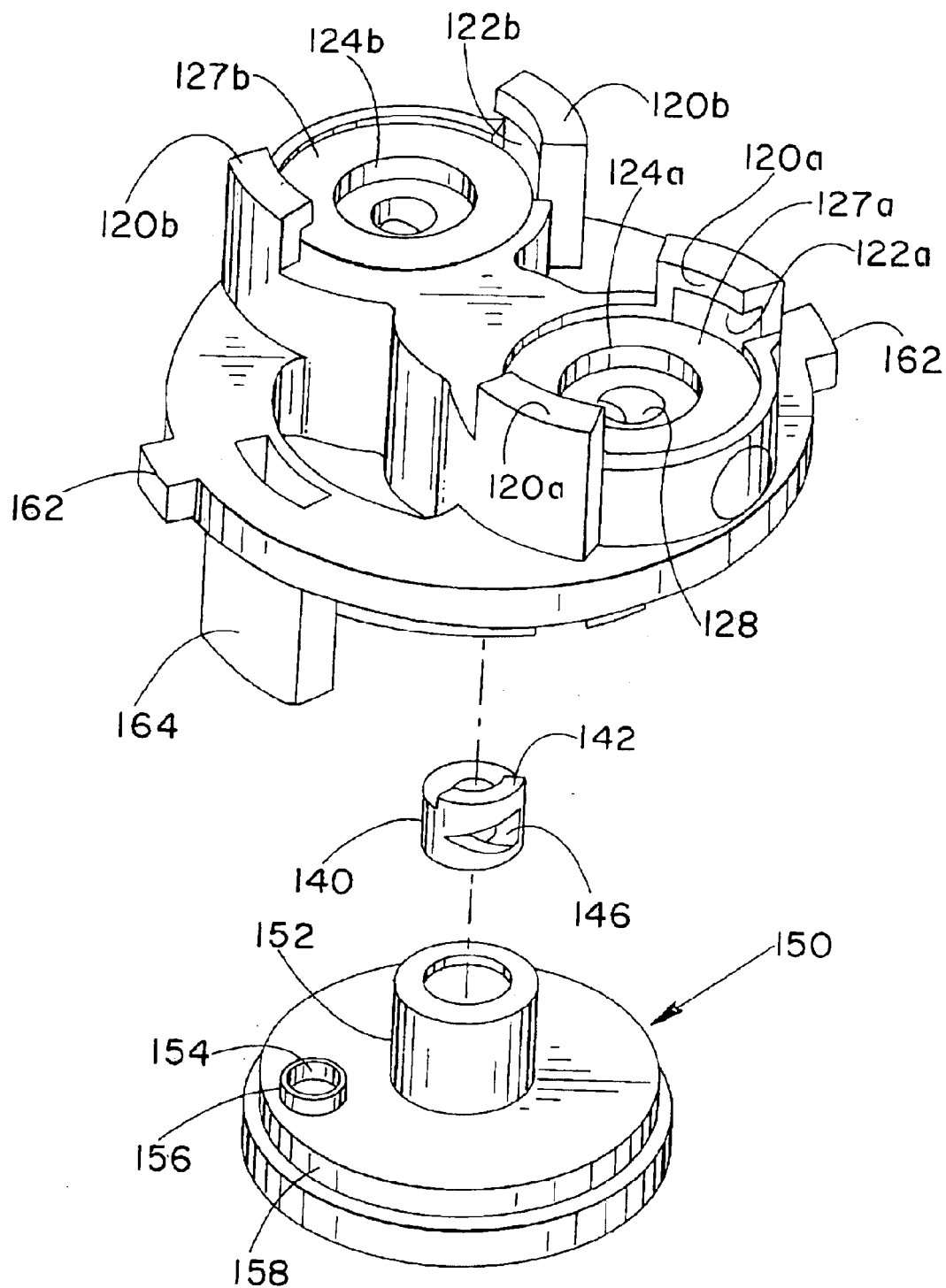
FIG. 17 shows an exploded perspective view of the nozzle body.
Figure 18:
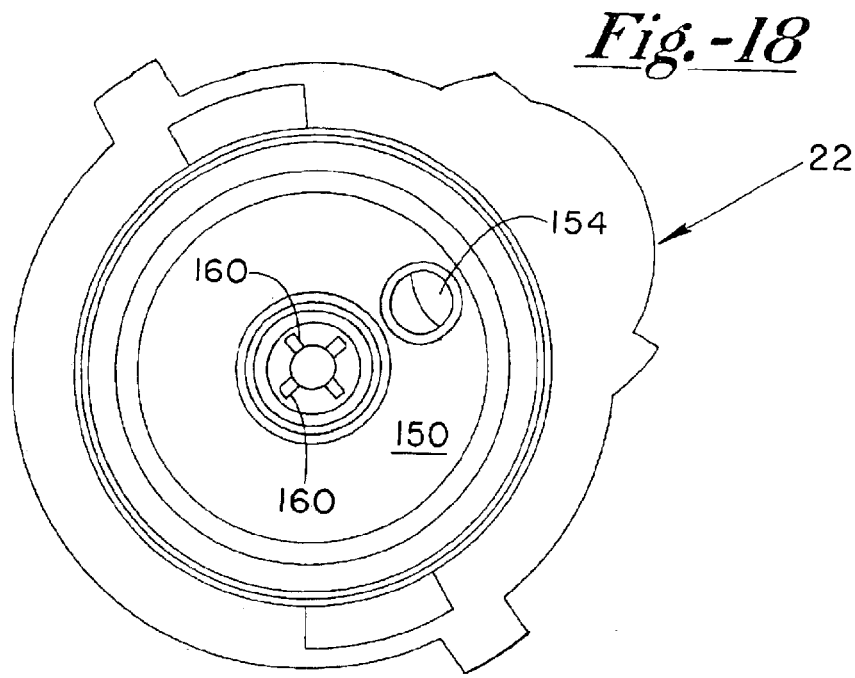
FIG. 18 shows a top plan view of the nozzle body.
Figure 19:
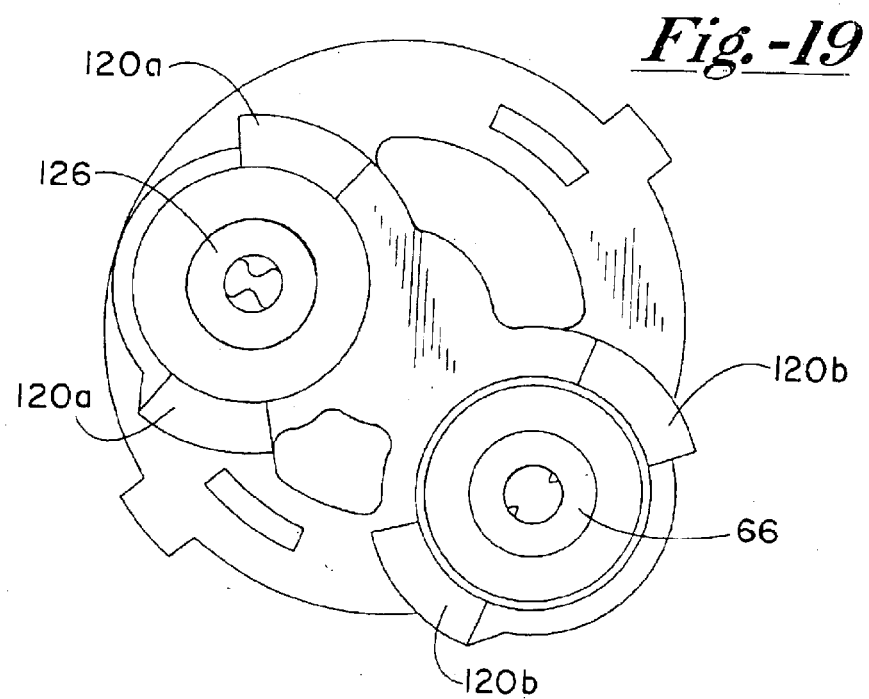
FIG. 19 shows a bottom plan view of the nozzle body.
Figure 20:
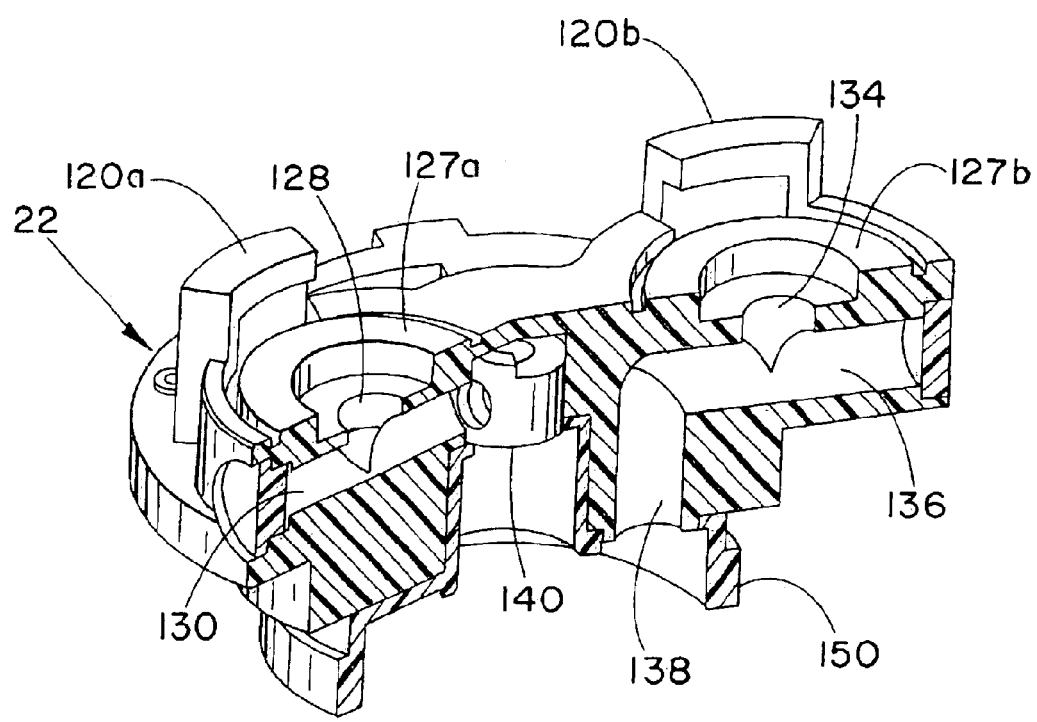
FIG. 20 shows a perspective cross-sectional view of the nozzle body.
Figure 21:
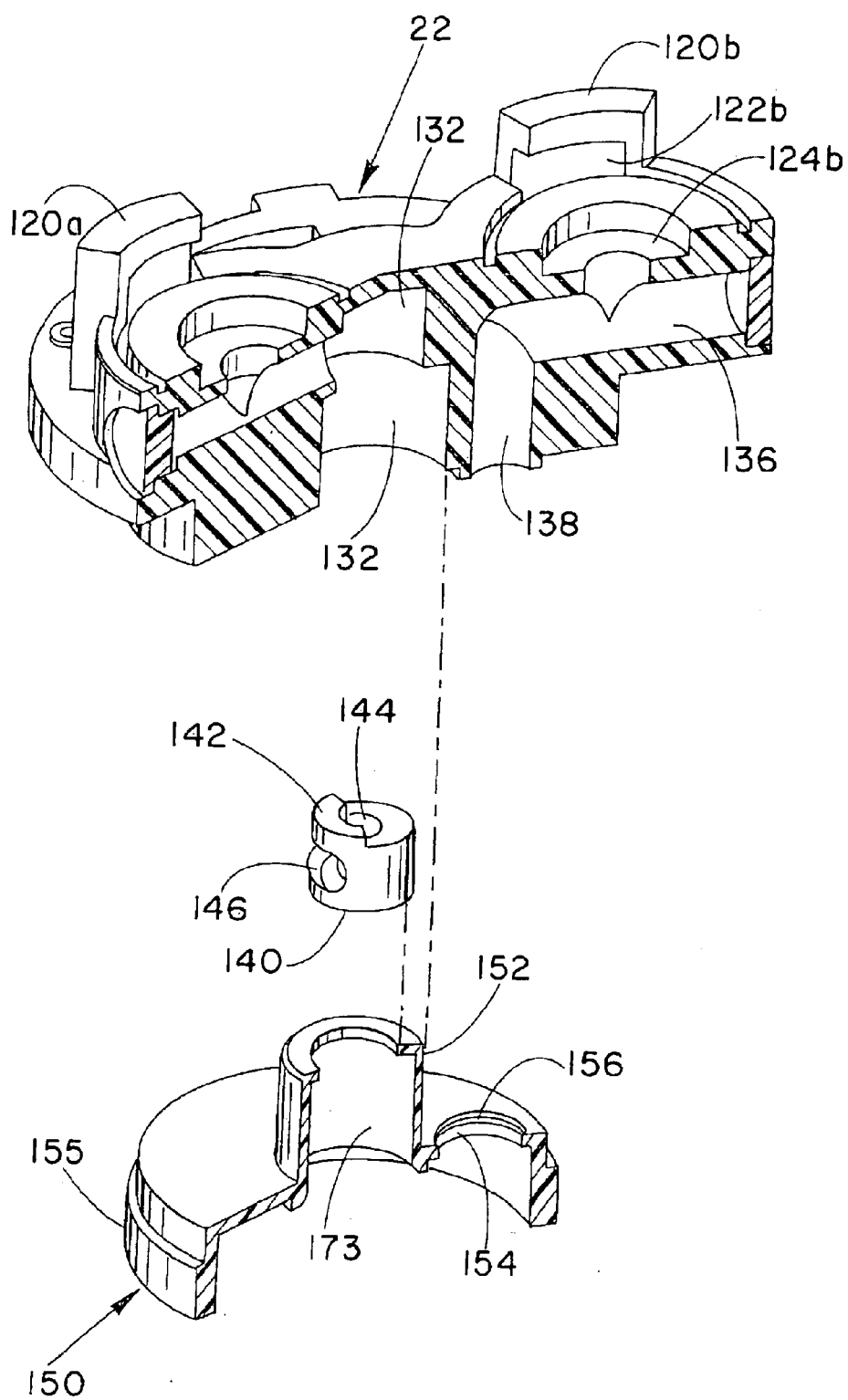
FIG. 21 shows an exploded perspective cross-sectional view of the nozzle body, syrup flow adjustment insert and retainer.
Figure 22:
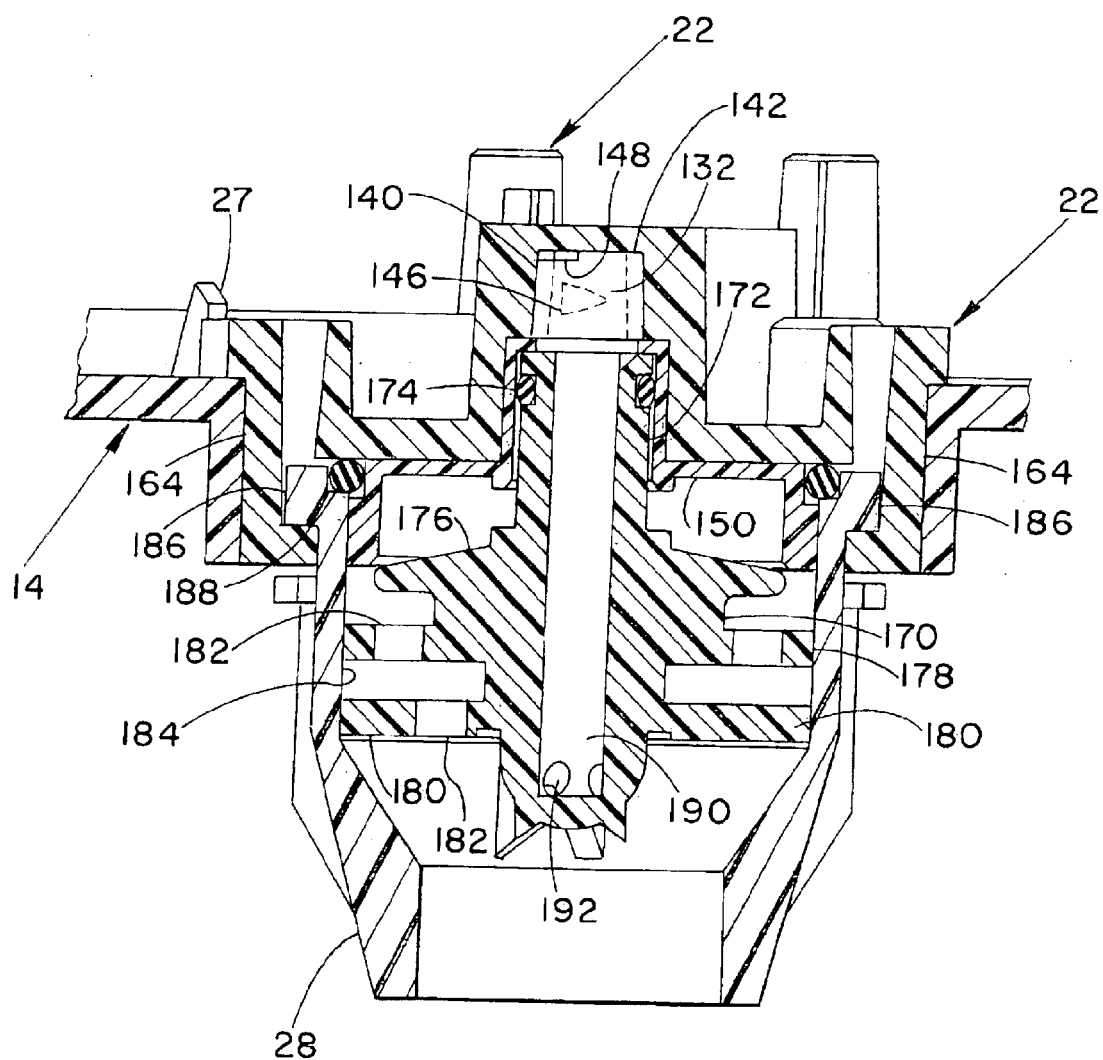
FIG. 22 shows a further cross-sectional view of the nozzle body as retained in the base plate.
Figure 23:
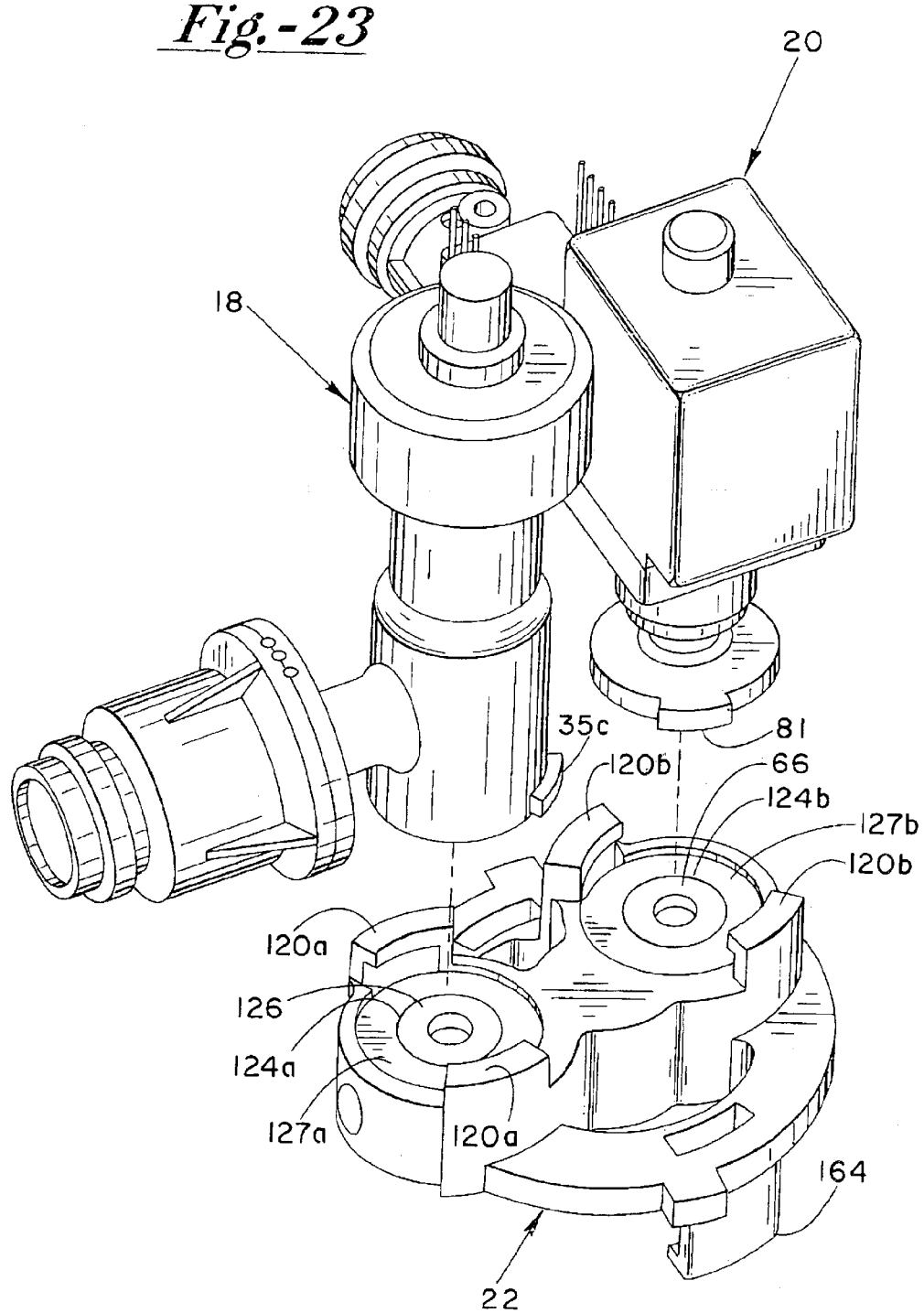
FIG. 23 shows an exploded perspective view of the syrup and water body assemblies along with the nozzle body.
Figure 24:
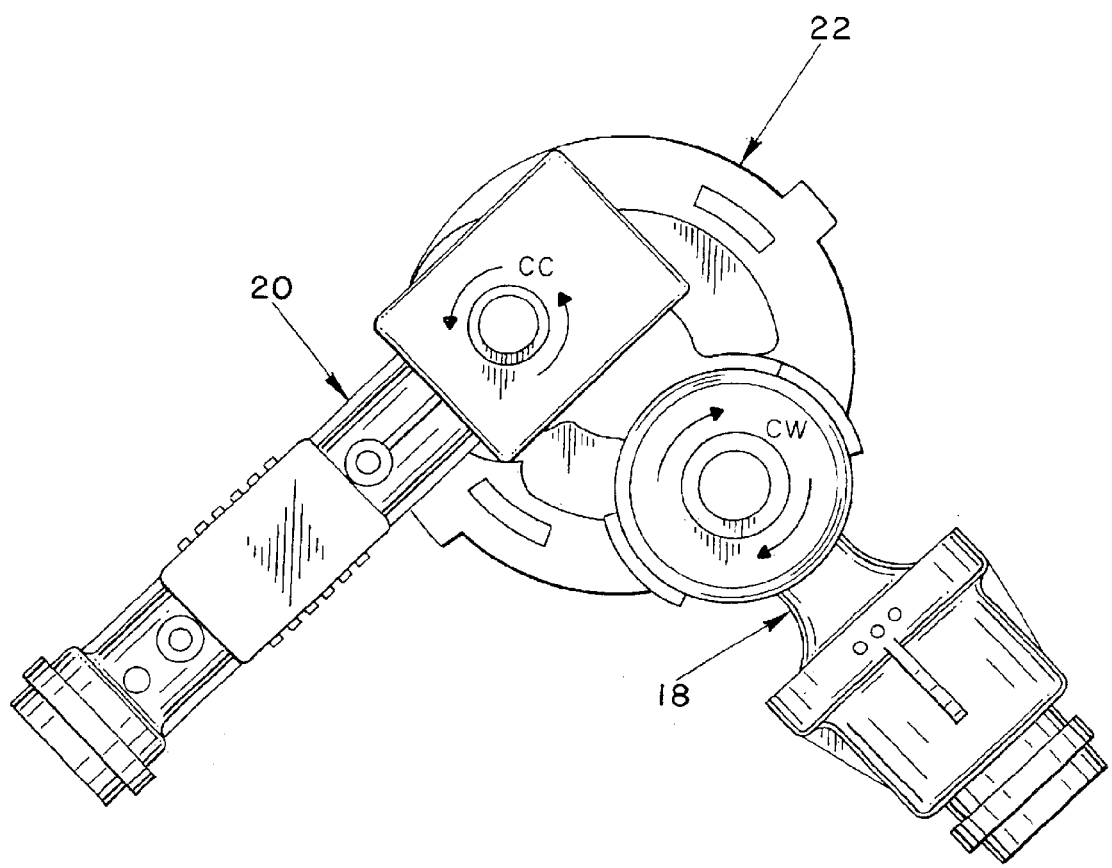
FIG. 24 shows a top plan view of the syrup and water body assemblies indicating their manner of attachment to the nozzle body.
Figure 25:
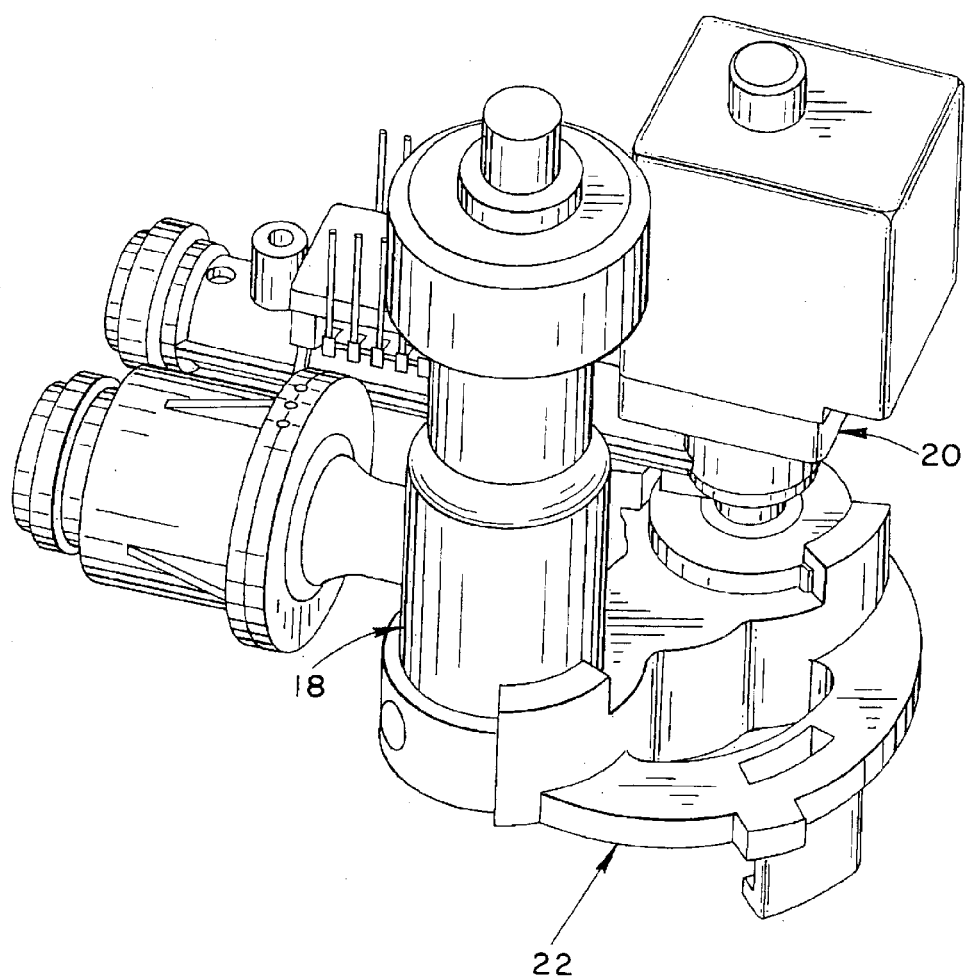
FIG. 25 shows a perspective view of the syrup and water body assemblies secured to the nozzle body.
Figure 26:
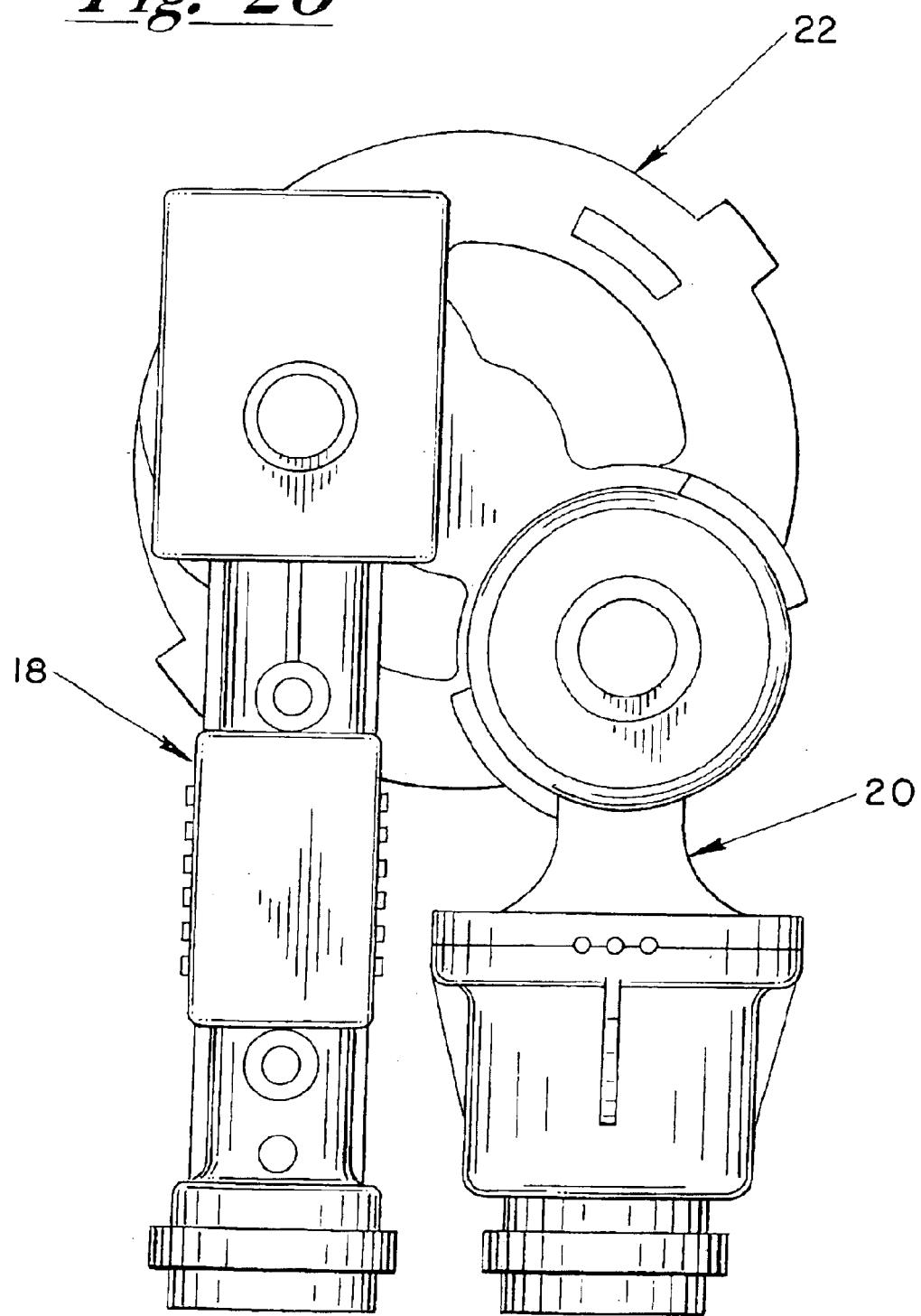
FIG. 26 shows a top plan view of the syrup and water body assemblies secured to the nozzle body.

As seen in FIGS. 17–23, nozzle flow body assembly 22 includes retainer stops 120a and 120b each defining tab receiving grooves 122a and 122b respectively. Annular recesses 124a and 124b serve to retain resilient fluid sealing washer and water seat 66 and a further resilient fluid sealing washer 126 respectively and are surrounded by flat circular areas 127a and 127b. A vertical syrup passage 128 fluidly connects with a horizontal syrup passage 130, which, in turn, fluidly communicates with a central syrup discharge outlet 132. Similarly, a vertical water passage 134 fluidly connects with a horizontal water passage 136, which, in turn, fluidly communicates with a water discharge outlet 138. A syrup flow adjustment piece 140 includes a protruding edge portion 142, a central bore 144 and a v-shaped slotted opening 146 extending there through into the bore 144. Adjustment piece 140 is held within syrup discharge outlet 132 wherein edge portion 142 is inserted within rotation limiting slot 148 and is held within outlet 132 by a disk shaped retainer 150. Retainer 150 includes a neck portion 152 for close fitting insertion into outlet 132 and includes a water flow hole 154 having an annular ridge 156 for insertion into water discharge outlet 138. Retainer 150 is permanently secured to nozzle body 22 by, for example, sonic welding thereto around its perimeter edge 158 and by sonic welding between outlet 138 and ridge 156. As seen in FIG. 16, adjustment piece 140 includes slots 160 in the bottom end surface thereof Nozzle body 22 also includes a pair of snap fitting tabs 162 for insertion into and snap-fitting securing thereof with retainers 27 of base plate 14. A fluid mixing insert 170 includes a neck portion 172 for insertion into retainer 150 and is fluidly sealed there with by and o-ring 174. Mixing insert includes a conical surface area 176 and two horizontal circular plates 178 and 180 positioned there below. Plates 178 and 180 include a plurality of passages 182 there through and the perimeter edges thereof are closely adjacent an interior flow surface 184 of nozzle housing 28. As will be understood by those of skill, nozzle housing 28 is fluid tightly secured to nozzle body 22 by a twisting engagement of tabs 186 thereof with retainers 164 thereof against an o-ring 188 there between. Mixing insert 170 also includes a central syrup channel 190 for directing syrup from outlet 132 to angled exit orifices 192.

By referring to FIGS. 23–26, the manner of assembly of syrup flow body assembly 18, water flow body assembly 20 and nozzle body assembly 22 can be understood. In particular, the lower end of syrup body portion 35 is centered on and pressed against surface area 127a after which it is turned counterclockwise as indicated by the arrows CC in FIG. 22 wherein tabs 81 fit within grooves 122a of stops 120a. This rotational movement of syrup body 18 is limited by stops 120a to place syrup assembly 18 in the proper orientation. In a similar manner, the lower end of water body portion 35a is centered on and pressed against surface area 127b after which it is turned clockwise as indicated by arrows CW wherein tabs 35c fit within grooves 122b. This rotational movement of water flow body 20 is limited by stops 120b to place it in the proper orientation. The assembly of the three flow bodies is then lowered into plate 14 wherein snap tabs 162 are received within retainers 27 providing for snap-fitting securing there between. It will be understood that a lower portion of annular ridges 84 and 72 of flow bodies 18 and 20 will rest on and be received in annular grooves 25a and 25b respectively. Nozzle housing 28 is then secured to nozzle body 22 in the manner above described capturing mixing insert 170 there between. Control electronics board 23 can be fit into slots 26a wherein retainer 27 snap fits into a slot, not shown, in board 23 thereby retaining board 23 in the vertical orientation as seen in FIG. 2. Those of skill will understand that the various electrical connections between flow sensor 74, pressure sensing board 106, stepper motor 36, solenoid 96 and circuit board 23 can be facilitated by releasable plug-in connectors. Housing 12 can then be secured to plate 14 by any of a variety of snap fitting releasable type securing means.

As is well understood, the general operation of valve 10 secured to a power supply to run stepper motor 36, solenoid 96 and control board 23 and to a quick disconnect 16, which disconnect 16 is suitably secured to a beverage dispenser and fluidly connected to a source of syrup and diluent. When valve 10 is secured to disconnect 16 pressurized sources of syrup and diluent are supplied to valve 10. When a suitable dispense button is selected by use of one of switches 24a–d, a particular volume of drink is requested as is previously programmed in the control of circuit board 23. Control board 23 signals stepper motor 36 to withdraw shaft 37 from contact with seat 66 thereby permitting the flow of water through body portion 34 and into nozzle body assembly 22. After a short delay, to be explained and described in greater detail below with regard to the specific operation of valve 10, solenoid 36 is opened permitting a flow of syrup through syrup body 80 to nozzle body assembly 22. The syrup and water then flow to mixing insert 170 and exit nozzle housing 28 into a cup held there below. As is well understood the water and syrup flows must flow at a pre-established ratio, for example, five parts water to one part syrup. Valve 10 accomplishes the maintenance of this ratio by simultaneously determining the flow rate of the syrup and the water and adjusting the flow rate of the water to the syrup. It will be appreciated by those of skill that the flow rate of the syrup is determined by a differential pressure flow rate sensor as is comprised of flow sensor chip 104, the flow washer 115 and flow channel portions 86a and 8b. It will be understood that as syrup flows through the central orifice of washer 115, different fluid pressures are presented to the up and down stream pressure sensors positioned on board 104 and above orifices 102a and 102b respectively. A micro-controller of control board 23 is programmed therewith and with variously experimentally determined data contained in lookup tables in order to permit the calculation of the actual syrup flow rate. At the same time as the syrup flow rate is being determined the water flow rate is being measured as a function of the rotational speed of the turbine flow sensor 74. This water flow rate is determined by the control of board 23 and compared with the calculated syrup flow rate in real time. If the ratio there between is not as is desired where, for example there is an excess of water, the micro-controller signals stepper motor 36 to move shaft 37 in a downward direction positioning conical surface 42 thereof closer to seat surface 64 of seat 66, thereby reducing the opening there between and lowering the water flow rate. Of course, those of skill will realize that micro-controller must be able to provide rotational instructions to stepper motor 36 to effect the desired water flow rate adjustment. As is known, stepper motors, such as motor 36, can be signaled to rotate through a set number of 360 degree rotations and/or fractions thereof that correspond to a know linear distance movement of the shaft thereof.

Figure 27:
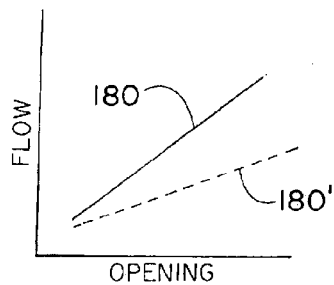
Figure 28:
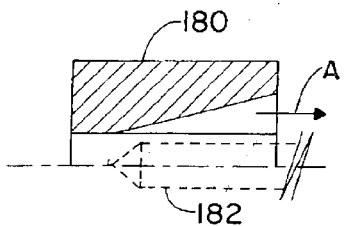
Figure 29A:
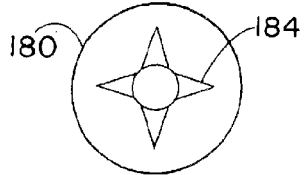
FIG. 29a shows a top plan view of an embodiment of a grooved regulator having four notches.
Figure 29B:
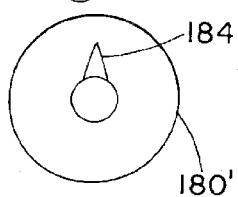
FIG. 29b shows a top plan view of a grooved regulator having one notch.
Figure 30:
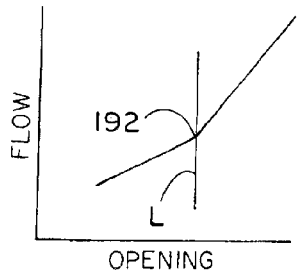
FIG. 30 shows a diagram of the flow characteristics of the grooved regulator of FIG. 32.
Figure 31:
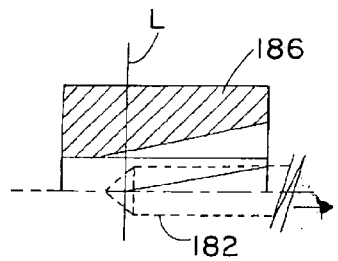
FIG. 31. show a schematic representation of a cross-section of the regulator of FIG. 32.
Figure 32:
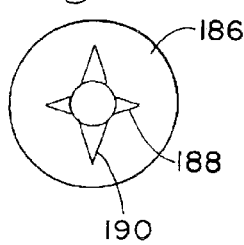
FIG. 32 shows a top plan view of a further embodiment of a grooved regulator having two notch pairs each pair having a different depth

If a standard circular valve seat is used having no regulator 44 there above, the flow rate there through is not linear. In fact, a major problem has been that the flow rate as a function of the separation between the seat of a standard orifice and the effective end of the shaft can be complicated to determine and to control. However, the flow regulator 44 shown herein has been found to establish a substantially linear relationship between the shaft 37 position vis a' vis the seat and the fluid flow rate. As seen in FIG. 28, a generalized regulator 180 is shown in cross section wherein flow rate there through is depicted in the graph of FIG. 27. As a shaft 182 moves in the direction of arrow A of FIG. 28, the flow rate of fluid through regulator 180 is shown in the graph of FIG. 27 to increase linearly. The slope of that line can be understood to be a function of the size or number of grooves 184 in regulator 180 or 180', as illustrated in FIGS. 29a and 29b. The slope can be understood to be lower for regulator 180' as seen in the dashed line of FIG. 27. FIGS. 30–35 show the effect of variously configured grooves. Regulator 186 of FIG. 32 includes, as does regulator 44, two sets of grooves, shallow grooves 188 and deep grooves 190. When shaft 182 reaches the point within regulator indicated by vertical line L of FIG. 31, the grooves 188 begin to contribute to the fluid flow and hence increase the slope of the fluid flow as indicated at the slope change point 192 of FIG. 30. It can now be appreciated that the increase if flow area provided by the additional set of grooves allows shaft 37 to travel through a shorter linear distance but still provide the desired increase in flow rate. The angles A1 and A2 and B1 and B2, seen in FIGS. 7–10, provide for increased flow rate in proportion to increase an in size thereof. Thus, the larger the grooves and the larger the bore 50, the more flow is permitted as the shaft withdraws. Of course, those of skill will understand that all such dimensions and angles are highly variable depending on the flow rate range, the desired flow accuracy, the travel of the linear actuator and the like. In a beverage dispense environment of 1 and ½ to 6 ounces per second, bore 50 can be approximately 0.185 inch.

Figure 33:
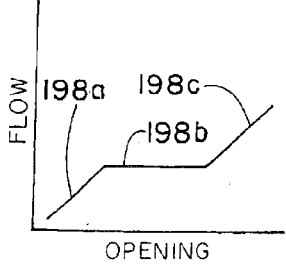
FIG. 33 shows a diagram of the flow characteristics of the grooved regulator of FIG. 35.
Figure 34:
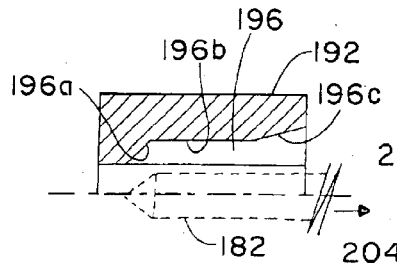
FIG. 34 show a schematic representation of a cross-section of the regulator of FIG. 35.
Figure 35:
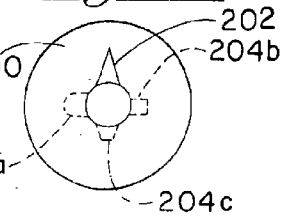
FIG. 35 shows a top plan view of a further embodiment of a grooved regulator.

As seen in regulator 194 of FIG. 34, a single groove 196 includes a first sloped portion 196a a horizontal or linear portion 196b and a further sloped portion 196c. As seen in the graph of FIG. 33, these three groove sections correspond with the flow rate curve portions 198a, 198b and 198c respectively. Thus, as shaft 182 withdraws from regulator 194 the flow rate first increases do to the widening effect of groove portion 196a. The flow rate then levels off as groove portion 196b represents a constant non increasing flow area. The flow rate then starts to increase as the shaft is withdrawn past groove portion 196c wherein the flow area is again increasing. FIG. 35 shows a regulator 200 having a V-shaped groove 202 and also shows in dashed outline various other regular geometric groove shapes such as a U-shaped groove 204a, a square shaped groove 204b or a trapezoidal shaped groove 204c. It will be understood that these other groove shapes can be angled to provide for increasing grooved area and greater fluid flow as the shaft 182 retracts. Thus, FIG. 35 illustrates that any of a wide variety of groove cross-sectional shapes and configurations can be used depending upon to achieve a linear flow as a function of shaft position within a grooved regulator. Thus, this linearity permits a relatively straightforward calculation by the control of board 23 as to the distance to move shaft 37 in or out to follow the sensed syrup flow rate. Therefore, the water flow rate is continually being adjusted in real time as a function of the sensed water flow rate and syrup flow rate.

Figure 36:
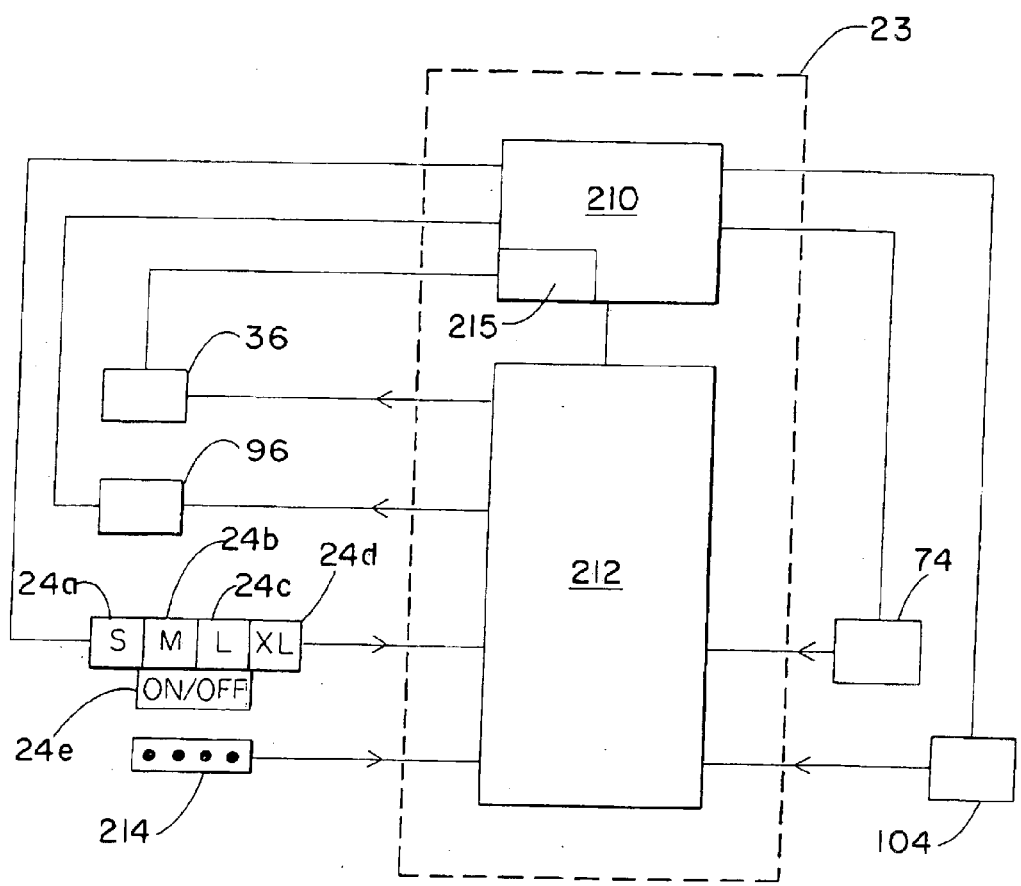
FIG. 36 is a simplified schematic of the electronic control of the present invention.

A more detailed understanding of the manner of the operation of the control of the operation of the present invention can be had by referring to FIGS. 36–39. As seen in FIG. 36, a simplified schematic of the present invention shows control board 23 including a power supply 210 and a micro-controller 212. Switches 24a–e, turbine 74 and differential flow sensor board 104 provide input to micro-controller 212. A connection port 214 is also connected to micro-controller 212 for purposes of facilitating adjustment of the operation of valve 10 as will be described in greater detail herein below. Microprocessor 212 is also connected to stepper motor 36 and solenoid 96 for controlling the operation thereof. Power supply 210 includes a capacitor array 215 for emergency powering of the stepper motor 36. If power should fail, syrup flow will automatically stop as solenoid 96 is normally closed, i.e. power is required to hold it open. However, those of skill will understand that stepper motor 36 will remain at whatever position it is at when power is interrupted. Therefore, capacitor array 215 provides power to close stepper motor 36 if power is sensed to have failed.

Figure 37:
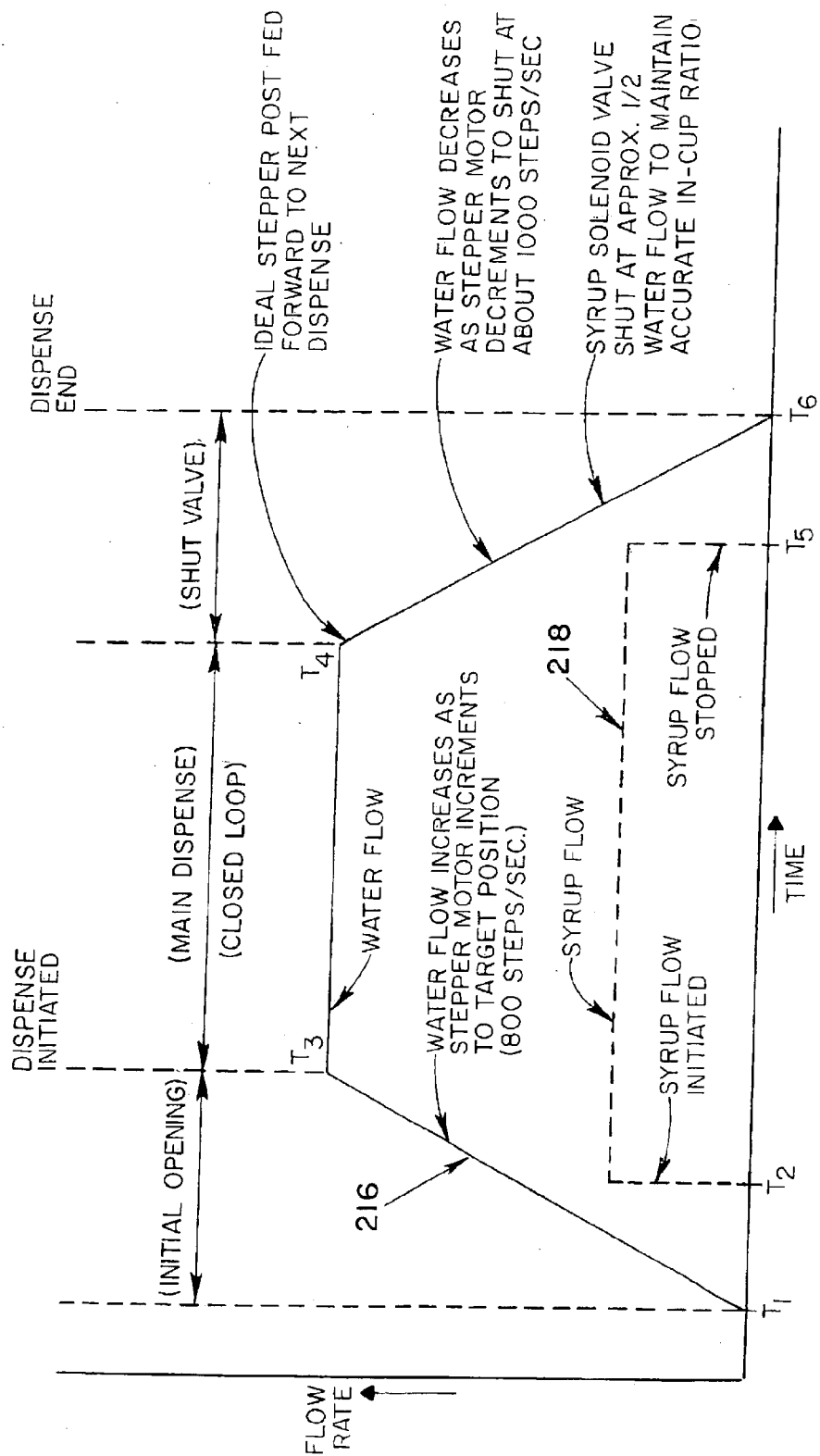
FIG. 37 shows a graphical representation of the operation of the stepper motor and syrup solenoid.

As seen in FIG. 37, a graph of the operation of the stepper motor 36 is represented by solid line 216 and syrup solenoid 96 is represented by a dashed line 218. Stepper motor opens at a time $T_1$ and the water flow subsequently ramps up to a desired flow rate at time $T_3$. At time $T_3$ stepper motor movement stops. Syrup solenoid 96 opens at a time $T_2$ after the initiation of water flow, but prior to time $T_3$, and quickly reaches a peak flow. This delay in the initiating of the syrup flow is necessary as those of skill will appreciate that stepper motor 36 can not open as quickly to it full flow position as can solenoid 96. Thus, if they were opened simultaneously, the finished drink would be too rich in syrup, the desired in cup ratio not being achieved. Therefore, initiation of a dispense into a cup by, for example, the pressing of switch 24e, signals microcontroller 212 to first operate motor 36 and then to open solenoid 96. At the close of dispense when the cup is fill, switch 24e can be released causing the reverse to occur. Specifically, at time $T_4$ motor 36 begins to close and then is fully closed at time $T_6$, and solenoid 96 is signaled to close at time $T_5$ there between. This staggering at closing, for the same reason stated above for opening, also serves to maintain the proper in cup ratio of syrup to diluent. The particular staggering time of the stepper motor and solenoid are dependent upon the type of stepper motor and solenoid used, the desired ratio between syrup and diluent water and the desired total dispense or flow rate of the two liquid combined.

Figure 38:
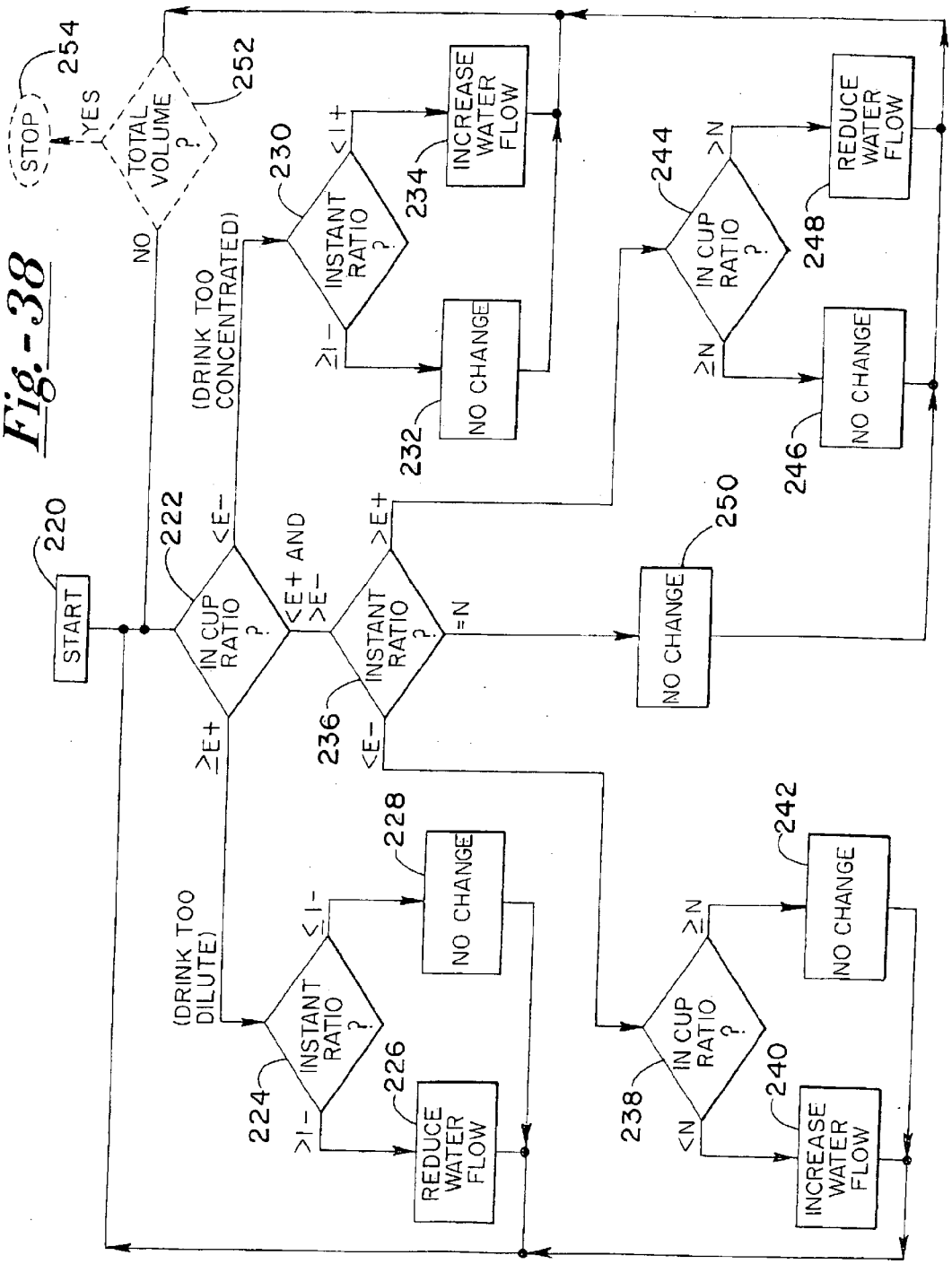
FIG. 38 is a graphical representation of the allowable ratio error limits.
Figure 39:
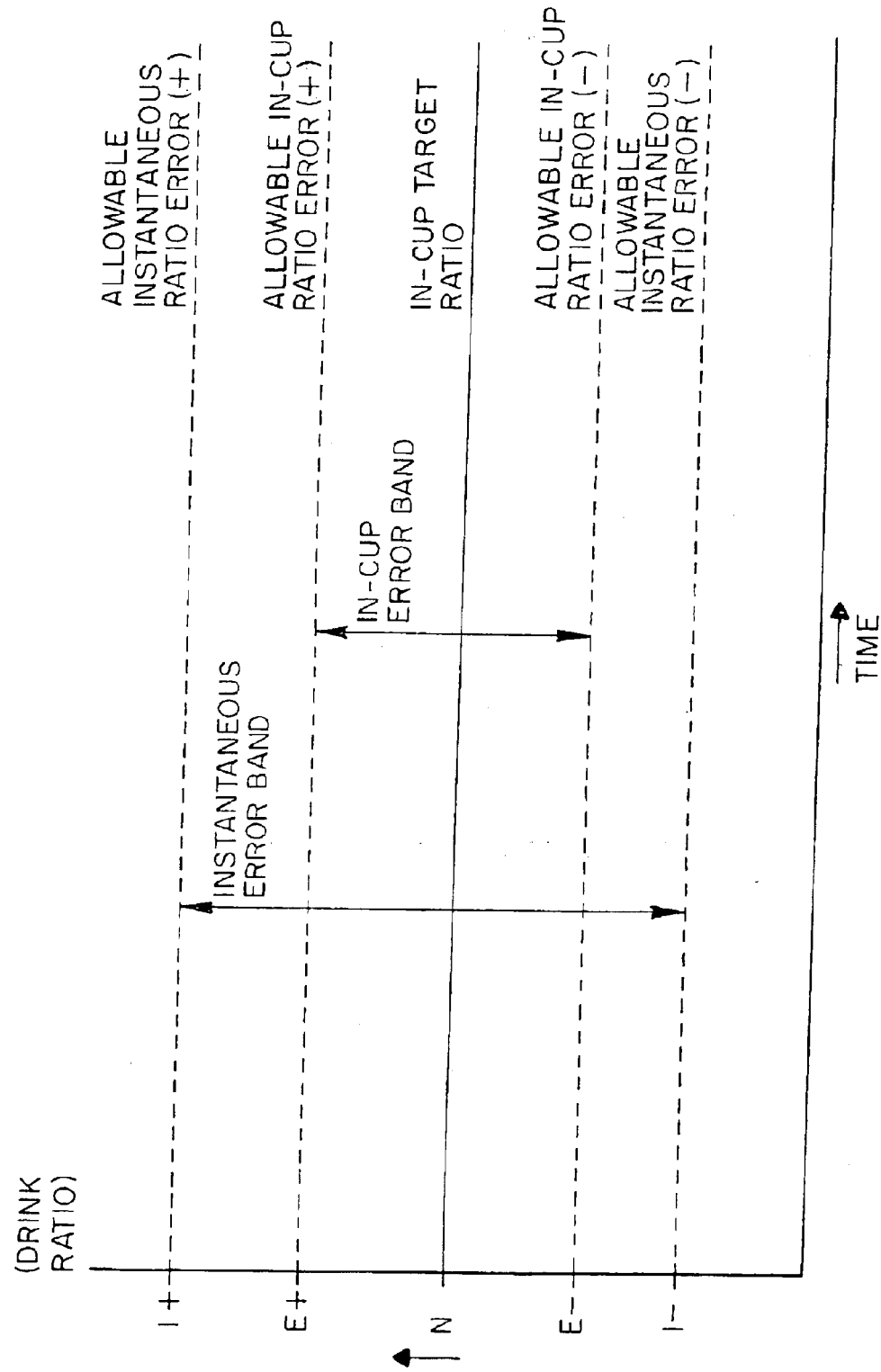
FIG. 39 a flow diagram of the control logic of the present invention.

A further detailed explanation of the control of the valve of the present invention can be had by referring to FIGS. 38 and 39. As illustrated graphically in FIG. 38, there exists a known or predetermined in cup target ratio N. If the ratio of the drink is 5 parts syrup to 1 part carbonated water, then the total volume of syrup and carbonated water in the cup must be ideally in that proportion, or within an acceptable error thereof. This is achieved by having micro-controller 212 keep track of two ratios, an instantaneous ratio and a total dispensed or in cup ratio. Thus, processor 212 is determining an instantaneous flow rate as a function of the differential pressure sensor determination of the syrup flow rate and the water turbine sensed flow rate of the water at a particular moment in time. Those of skill will understand that controller 212 makes such calculations many time per second and in a particular embodiment of the invention, approximately 100 times per second. The in cup ratio is simply a calculation comprising a summation of the total syrup and water flow as a function of the known flow rates thereof as have occurred during a particular pour. Thus, at any point in time, processor 212 knows the total volume that has been dispensed, the ratio of that total dispense and what the ratio being dispensed at any particular point in time is. Processor 212 is programmed with an allowable positive in cup ratio error E+ and an allowable negative in cup ratio error E− creating an in cup error band indicated by the arrow B1 in FIG. 38. Processor 212 is also programmed with an allowable positive instantaneous ratio error I+ and an allowable negative instantaneous error I− creating an instantaneous error band indicated by the arrow B2 in FIG. 38. With the foregoing in mind, a further understanding of the operation of the control of the present invention can be had by referring to the flow diagram of FIG. 39. A pour of beverage from valve 10 into a suitable container position below nozzle 28 is initiated by an operator selecting one of the pour initiation switches 24a–e. Pour initiation is seen in block 220. At block 222, processor 212 determines if the in cup ratio is greater than or equal to E+, less than E−, or within that error band, i.e. less than E+ and greater than E−. If the in cup ratio is greater than or equal to E+, at block 224 the instantaneous ratio is determined. If the instantaneous ratio is greater than I−, at block 226 stepper motor 36 is activated to move shaft in the closing direction reducing water flow. conversely, at block 228 if the instantaneous ratio is less than or equal to I− then no change is made to the position of stepper 36. If at block 222 it is determined that the in cup ratio is less than E− then at block 230 the instantaneous ratio is also calculated. If that ratio is less than or equal to I+, then at block 232 no change is made to the position of stepper 36. However, if the instantaneous ratio as checked at block 230 is less than I+ then the drink is too syrup concentrated at that point and stepper 36, at block 234 is made to move to increase water flow. Those of skill will understand that the instantaneous ratio is being constantly calculated and occurs as the stepper motor 36 is moving either towards its seated closed position to make the ratio less dilute or towards its full open position to make the ratio more dilute. Thus, the control cycle back through block 222 until the sensed instantaneous ratio is within the in cup ratio error band. At that point at block 236 the instantaneous ratio is again determined and if it is less than E− the in cup ratio is calculated at block 238. If the in cup ratio is less than N, stepper motor 36 is operated at block 240 to increase the water flow. Conversely, if the in cup ratio at block 238 is greater than or equal to N, then at block 242 no change is made to the stepper motor position. If at block 236 the instantaneous ratio is determined to be greater than E+ the in cup ratio is calculated at block 244. If, at block 246 the in cup ratio is less than or equal to N stepper motor 36 position is not changed. Conversely, if the in cup ratio at block 244 is greater than N, then at block 242 stepper motor 36 is operated to reduce water flow. If at block 236 the instantaneous ratio is equal to N, then at block 250 no change is made to the position of stepper motor 36. Those of skill will understand that the control as shown in FIG. 39 permits the instantaneous ratio to first be brought within a wider instantaneous ratio band and then to be brought within a narrower in cup ratio error band. This approach was found to provide for a relatively smooth operation whereby the desired ratio N was approached without the need for a lot of movement by stepper motor 36. The position that motor 36 is first opened to is determined by memorizing its position during the previous pour at the point at which the in cup ratio and the instantaneous ratio are equal or the closest. If there exists no previous pour data, a default position is preprogrammed. When the dispense from valve 10 is manual, as by the use of switches 24e or lever arm 19, dispensing is stopped when such switches are released.

Figure 40:
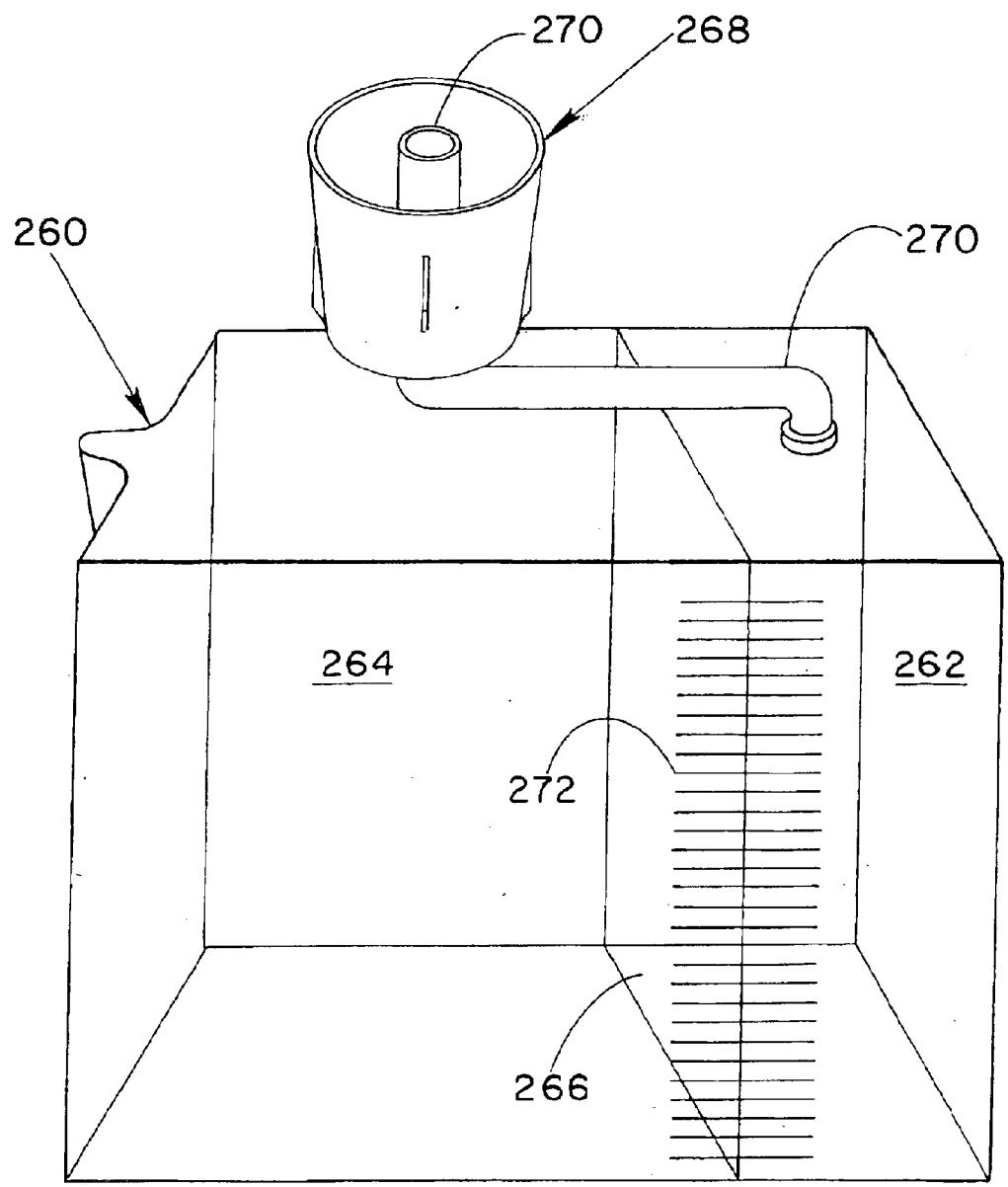
FIG. 40 shows a perspective view of a ratio testing device.

It can now be appreciated that selection of a drink volume using switches 24a–d signals micro-controller 121 to determine when the total volume dispensed is equal to the predetermined and selected small, medium, large or extra large volume. Thus, a further block 252 questions if that pre-selected total volume has been reached. If it has, then dispensing is stopped at block 254. Due to variations in the manufacture of certain elements, such as, the turbine flow meter, the differential pressure sensors and the like, it was found that there can exist a difference between the ratio that the valve is set at and the actual in cup ratio that is dispensed. Thus, valve 10 can be adjusted or zeroed in through an actual pour test. As seen in FIG. 40, a brix cup 260 is shown comprising a clear plastic dual chambered cup having a syrup volume side 262, a water volume side 264 and a divider 266 there between. As is known a specialized separating nozzle is 268 is used in place of the regular nozzle and insert. Nozzle 268 includes a tube 270 for insertion into the syrup discharge hole and directs the stream of syrup to syrup container portion 262. As is also understood, water flows around tube 270 and down into water container portion 264. In operation, valve 10 is actuated and allowed to dispense until the water reaches a particular level as is indicated by the graduation marks 272. Since the syrup stream is separated from the water its volume can also be determined by ascertaining its level. By simply dividing the water volume by that of the syrup the ratio there between can be calculated. If for example, a 5 to 1 ratio was desired however a 4.8 to 1 ratio was dispensed, then the software of micro-controller 212 must be adjusted to compensate therefor. This is done by connection of a device to port 214. Such a device can be a hand held computer or the like having the ability to increment the ratio set point of the software control up or down as is needed upon an initial set up. It is also then possible thereby to subsequently set valve 10 to a different ratio wherein the software will automatically do so and take into account any such initial set up adjustments.

Valve 10 can be designed to dispense at various dispense rates, such as, 1½ ounces per second, 4 Ounces per second and 6 ounces per second. However, it was found that, since the syrup flow rate can not be adjusted during a dispense, it is important that it be capable of being adjusted within various flow ranges suitable for the particular total drink flow desired. The control would otherwise have difficulties in maintaining the correct ratio if the water and syrup flow rates were not at least generally matched. This gross adjustment of the syrup flow is accomplished by adjustment of insert 140. As can be understood triangular shaped slot 146 is presented towards syrup orifice end of syrup flow channel 130. As insert 140 is rotated about its central bore axis more or less of the slot 146 is presented thereto thus permitting a greater or lesser flow respectively of syrup there through. Thus, rotation of insert 140 by a tool inserting into slots 160, after removal of nozzle housing 28 and the mixing insert, permits such gross adjustment of syrup flow. The aforementioned brixing cup 260 and adjustment nozzle 268 can be used to set the desired syrup flow rate.

A further advantage of the present invention can be seen to include the manner of assembly and disassembly thereof. When water body assembly 18 and syrup body assembly 20 are connected to nozzle body assembly 22 and secured to base 14, it will be appreciated that ridge 72 of water body assembly 18 and ridge 84 of syrup body assembly are received in annular grooves 25b and 25a respectively. Furthermore, when quick disconnect is connected to base plate 14 the fluid coupling inserts 30a and 30b thereof are received in water body inlet end opening 70 and syrup body inlet end opening 84 respectively. This connection strategy serves to hold water body 18 and syrup body 20 in place as neither can be rotated. Thus, neither can be removed when fluidly connected to pressurized sources of water and syrup. To be removed quick disconnect must first be removed, but it can not be removed unless the barrel valves thereof have been closed. Thus, valve 10 can not be disassembled unless there exists no fluid pressure thereto. Clips 27 also serve to hold serve to hold the entire water, syrup and nozzle assembly in place joining thereof to base 14. It can also be understood that the entire valve can be easily assembled and disassembled by hand. Moreover, stepper motor 36 is a permanent portion of the water body assembly as is turbine flow meter 74. Thus, any failure of that component simply involves change out with a new replacement. Such is also the case for the syrup body 20, the nozzle body 22 and the circuit board 23. Thus, the present invention is fully modular and easily and inexpensively repaired and serviced.

Valve 10 has been shown and described herein in its preferred beverage dispensing valve embodiment. However, those of skill will appreciate that the various changes and modifications can be made thereto without exceeding the scope and spirit thereof For example, a variety of flow sensors are known that could be substituted for turbine flow sensor 74 and/or differential pressures flow sensor 104, such as, coreolis and ultrasonic flow sensors. A "mechanical" sensor of the turbine type wherein the flow of water imparts a rotation thereto has been found to be sufficiently accurate, reliable and low in cost when applied to sensing water flow in the present invention. The differential pressure sensing of the syrup has proven to be more accurate with the higher viscosity liquids such as a beverage syrup. Moreover, such sensing approach has also proven reliable, acceptably accurate and low in cost. Those of skill will understand that various embodiment of the invention herein could use a turbine flow meter on both the diluent and concentrate side, or a differential pressure flow sensor on each side, or indeed, could reverse the sensors and use a turbine on the concentrate side and a differential pressure flow sensor on the diluent side. Such selections would depend greatly upon the physical nature of the fluids being combined, their individual anticipated flow rates, their ratio of combination, accuracy required and the like. It will also be apparent to those of skill that a linear actuating means r, such as, a linear solenoid or pneumatic actuator, could be substituted for stepper motor 36. The functional requirement being that shaft 37 is capable of being moved incrementally and held at a variety of points between and including a fully open and a fully closed position.

Figure 41:
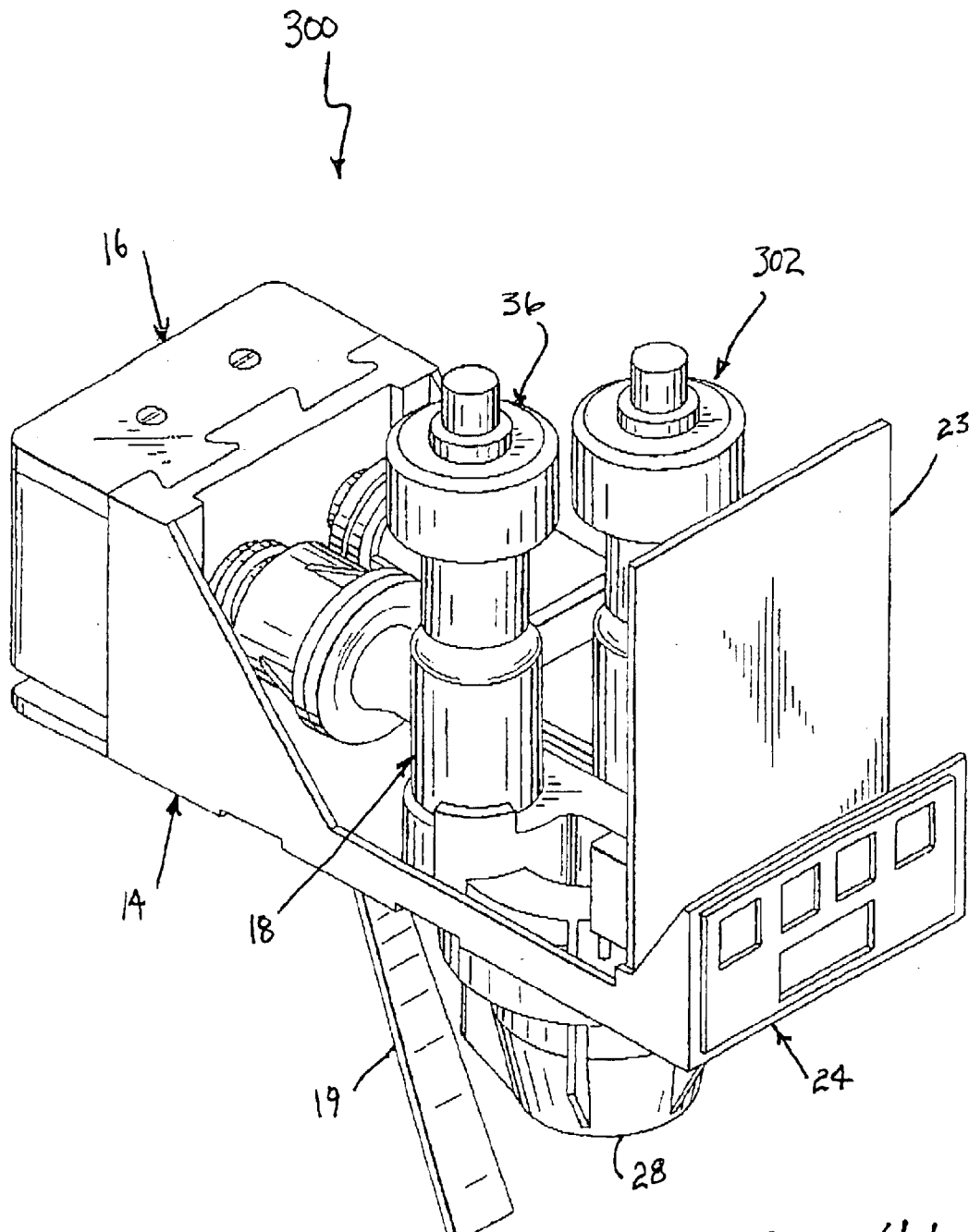
FIG. 41 shows a perspective view of a further embodiment of the present invention.
Figure 42:
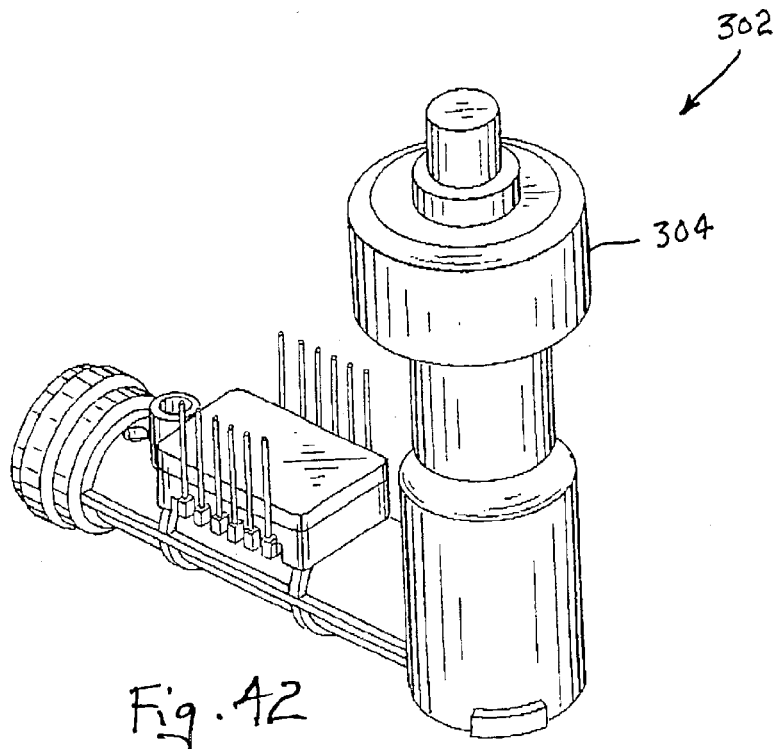
FIG. 42 shows a perspective view of the syrup flow body of the embodiment of FIG. 41.
Figure 43:
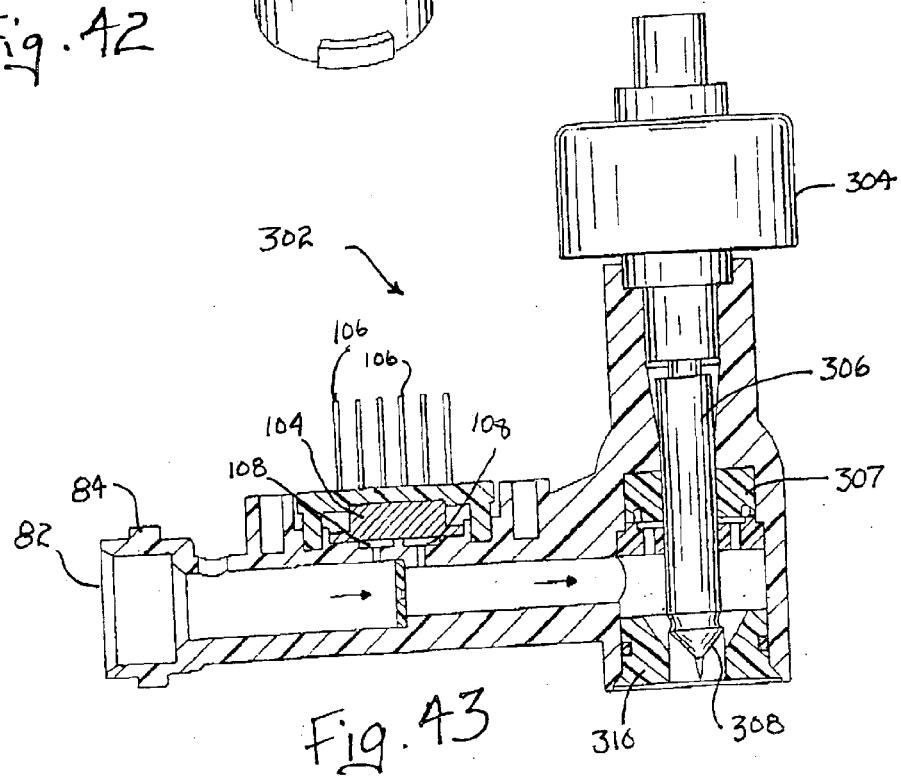
FIG. 43 shows a cross-sectional view of the syrup flow body of FIG. 42.

A further embodiment of the present invention is seen in FIGS. 41–43. Valve 300 is the same as valve 10 in most respects and common elements thereof are indicated by the same reference numerals as previously described herein. The difference between valves 10 and 300 lies in the fact that there exists in valve 300 a different syrup module 302. Syrup module 302 instead of being operated by an on/off solenoid, as with water module 18, is also operated by a stepper motor 304. Thus, module 302 includes a shaft 306 having a conical or tapered distal end portion 308 operating within a grooved flow control element 310. Control element is essentially the same as element 44, however those of skill will understand that the various dimensions thereof as to the particular groove geometry and dimensions as well as that of the central bore can be different from that of element 44 depending upon the ratio of the particular syrup or concentrate to the diluent. Concentrate module 302 therefor serves to control the flow rate of the concentrate in the same manner as described previously herein for the control of the diluent flow rate by module 20.

Those of skill can appreciate that the use of two stepper motors in ratioing valve 300 of the present invention provides certain advantages over valve 10. Primarily, there exists the potential for more flexible and accurate control of the ratioing process. For example, if the ratio is adjudged to be too lean, valve 300 can be controlled to either decrease the diluent flow or increase the concentrate flow. Conversely, if the ratio is sensed to be too rich, the concentrate flow can be reduced or the diluent flow increased. Also, the staggering of the initiation of the diluent and concentrate flows is not required as both flows can be cormmenced simultaneously given that neither opening is substantially mechanically different in terms of being slower of faster than the other. Thus, the initial volume of mixed liquids can be more accurately blended in a quantitative sense than is the case where an approximation has to be made where there are mechanical differences between two valve opening strategies.

Figure 44:
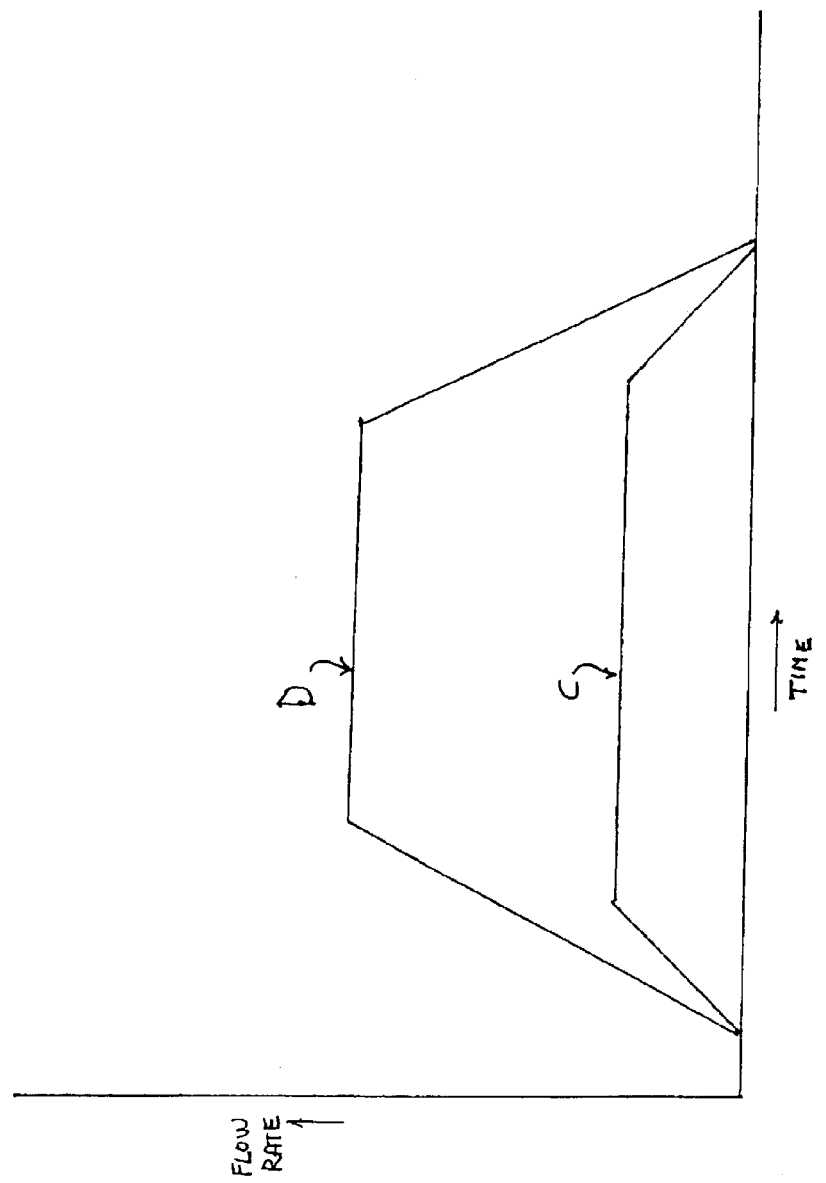
FIG. 44 show a graphical representation of the operation of the syrup and water flow bodies of the embodiment of FIG. 41.
Figure 45:
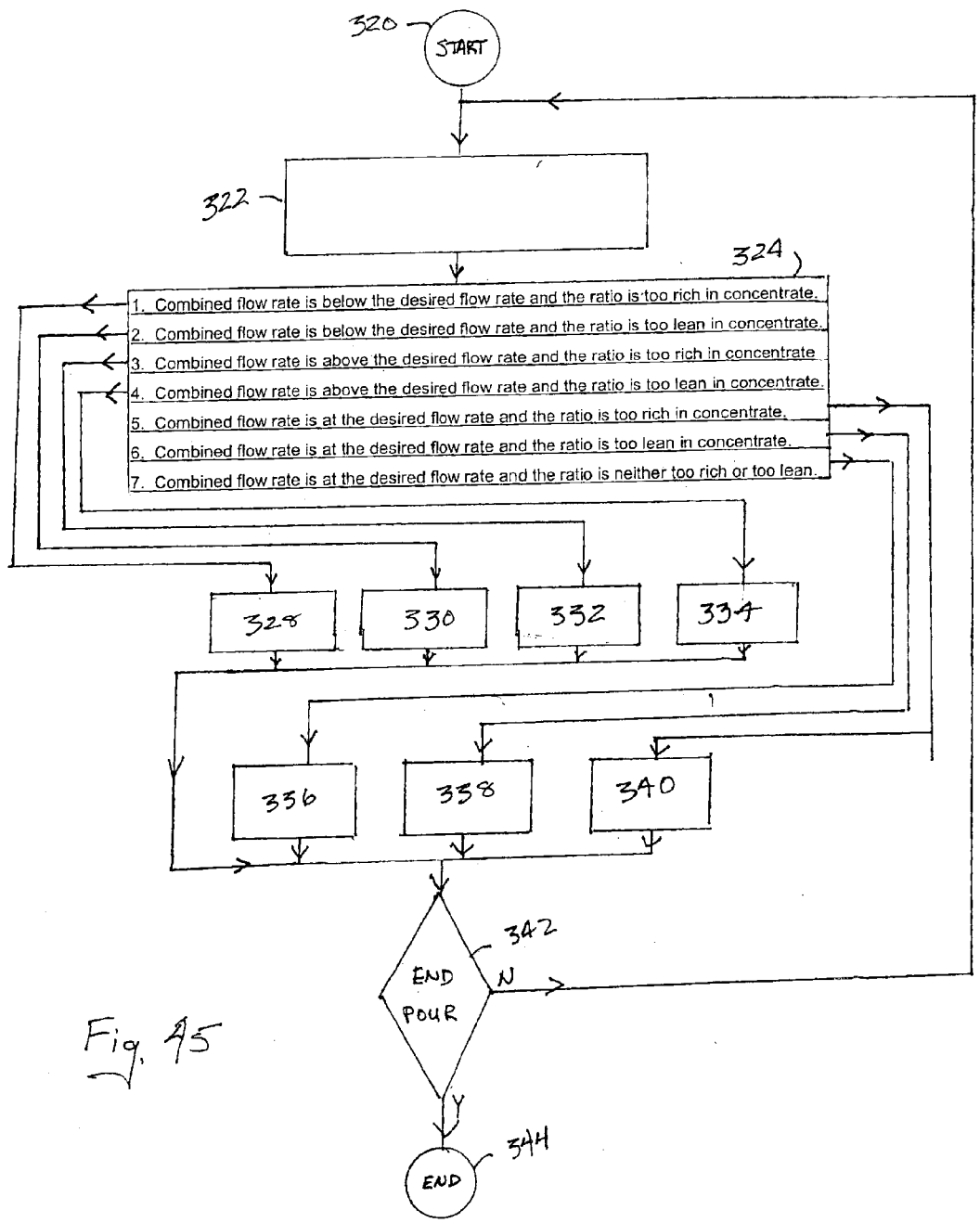
FIG. 45 shows a flow diagram of the operation of the valve embodiment of FIG. 41.

A better understanding of the flow control of valve 300 can be understood by reference to the pour profile graph of FIG. 44 and the flow control logic as seen in the flow diagram of FIG. 45. At block 320 of FIG. 45, the control is awaiting a signal indicating the initiating of a dispense. If an initiation is sensed, then at block 322 both stepper motors 36 and 304 are operated to retract to predetermined positions to allow for a target total volume flow rate as is also predetermined and programmed into the control. Those of skill will understand that upon initial start-up a first or default position is used to position the shaft of each stepper motor. If there has been a previous pour, then the initial positions for each stepper are the last in-ratio positions. At the instant both stepper motors are opened and during the entire dispense control 23 is determining the flow rate of each of the concentrate and diluent individually and calculating instantaneous and total or combined flow rates. As with each dispense there exists a predetermined desired total combined flow rate of both liquids and a predetermined desired ratio there between, those of skill will appreciate that at any given instant there can exist seven different possible conditions, namely:

1. A combined flow rate that is below the desired flow rate and where the ratio is too rich in concentrate.

2. A combined flow rate that is below the desired flow rate and where the ratio is too lean in concentrate.

3. A combined flow rate that is above the desired flow rate and where the ratio is too rich in concentrate 4. A combined flow rate that is above the desired flow rate and where the ratio is too lean in concentrate.

5. A combined flow rate that is at the desired flow rate and where the ratio is too rich in concentrate.

6. A combined flow rate that is at the desired flow rate and where the ratio is too lean in concentrate.

7. A combined flow rate that is at the desired flow rate and where the ratio is neither too rich or too lean.

The particular condition above is determined at Block 324. Those of skill will also understand that the desired total flow rate and desired ratio are, in practice, predetermined ranges. Thus, if the total flow rate or ratio are within their respective ranges they are considered to be "correct" and on target. The "narrowness" of each range is settable as is desired for the particular fluids being mixed, and particularly with respect to the desired degree of accuracy required for their mixture. Of the two basic variables, total flow rate and ratio, it will be appreciated that the ratio between the two liquids is generally the more critical issue with the total flow rate being secondary in importance. In the example of a post-mix dispensing of a beverage, it is of greater importance that the syrup concentrate be mixed at the proper ratio with the carbonated water diluent than it is that the cup into which the total beverage is being dispensed is filled at some desired rate.

If condition 1 above exists, where the total flow rate is too low and the mixture having an over preponderance of one of the liquids, in this case identified as the concentrate, the control takes the most direct action whereby both the flow rate is increased and the mixture leaned, namely the diluent liquid flow rate is increased, block 328. In other words the control takes one action, where possible, to most directly and efficiently correct both out of range problems. If condition 2 exists, it will be clear that the most direct path is to increase the concentrate flow rate, block 330. Where condition 3 exists the most direct path is to decrease the concentrate flow, block 332. If condition 4 exists then the diluent flow rate id decreased, block 334. Where condition 5 exists, the adjustment is more complicated and requires that the concentrate flow first be decreased to get the ratio within range and then increasing proportionately the flow of the concentrate and the diluent in a coordinated fashion to move the total flow rate within range, block 336. Condition 6 requires that the concentrate flow rate then be increased to first achieve the correct ratio followed by the coordinated reduction of both the concentrate and the diluent to get the total flow rate within range, block 338. If condition 7 exists, no action need be taken, block 340. Those of skill can understand that if one of conditions 1–4 exist, the actions taken at blocks 328–334, may not result in achieving the desired total flow rate. In other words, the increase or decrease of the concentrate or diluent that is required to achieve the desired ratio may not be sufficient to achieve the desired total flow rate. Thus, if the total flow rate of the water and syrup is too low they both are coordinately increased to achieve the desired total flow rate, and conversely if the flow rates of both the concentrate and diluent are too high they are coordinately decreased to achieve the desired total flow rate. At block 342 it is determined if the pour is ended and if so the routine is stopped at block 344, otherwise the sensing and pour routine continues.

What is claimed is:

1. A dispensing valve for dispensing two liquids there from, comprising:

a water body assembly defining a water flow channel there through, a first end of the water flow channel for connecting to a source of water, and the water body having means for regulating a flow of water through the water channel, a syrup body assembly defining a syrup flow channel there through, a first end of the syrup flow channel for connecting to a source of syrup, and the syrup body having means for regulating a flow of syrup through the syrup channel, a nozzle body for releasably securing the water body assembly and the syrup body assembly thereto so that a second end of the water channel and a second end of the syrup channel are fluid tightly secured to a nozzle body water flow channel and a nozzle body syrup flow channel respectively and the nozzle body water and syrup flow channels fluidly connected to a discharge nozzle.

2. A dispensing valve for dispensing two fluids there from at a desired ratio there between, comprising:

a first fluid body assembly defining a first fluid flow channel there through, a first end of the first fluid flow channel for connecting to a source of a first fluid, and the first fluid body having means for regulating a flow of the first fluid through the first fluid channel including a first shaft extending in the first fluid flow channel with a proximal end connected to and operated by a first positioning drive means and a distal end moving within a first flow control element, and the first positioning drive means for accurately moving the shaft distal end to a plurality of positions corresponding to a plurality of first liquid flow rates between a flow stop position and a full flow position so that the flow rate of the first fluid out of a second end of the first fluid flow channel is regulated as a function of the position of the shaft distal end relative to the first flow control element, a second fluid body assembly defining a second fluid flow channel there through, a first end of the second fluid flow channel for connecting to a source of a second fluid, and the second fluid body having means for regulating a flow of the second fluid through the second fluid channel including a second shaft extending in the second fluid flow channel with a proximal end connected to and operated by a second positioning drive means and a distal end moving within a second flow control element, and the second positioning drive means for accurately moving the shaft distal end to a plurality of positions corresponding to a plurality of second liquid flow rates between a flow stop position and a full flow position so that the flow rate of the second fluid out of a second end of the second fluid flow channel is regulated as a function of the position of the shaft distal end relative to the second flow control element, a nozzle body for securing the first fluid body assembly and the second fluid body assembly thereto so that the second end of the first fluid channel and the second end of the second fluid channel are fluid tightly secured to a nozzle body first fluid flow channel and a nozzle body second fluid flow channel respectively and the nozzle body first and second flow channels fluidly connected to a discharge nozzle, first and second flow sensing means in the first and second fluid flow channels respectively for separately sensing the first and second fluid flow rates and the first and second flow sensing means communicating the sensed flow rates of the first and second fluids to a control means and the control means regulating the operation of the first and second positioning means to adjust the positions of the distal ends of the first and second shafts relative to the first and second flow control elements as a function of the sensed flow rates of the first and second fluids so that the first and second fluids are dispensed out the discharge nozzle at a predetermined ratio there between.

3. The dispensing valve as defined in claim 2, and the control means regulating the first and second flow rates dynamically during the dispensing thereof out of the discharge nozzle.

4. The dispensing valve as defined in claim 2, and the first and second positioning means comprising stepper motors.

5. The dispensing valve as defined in claim 2, and the first and second fluid body assemblies releasably securable to the nozzle body.

* * * * *